(12) United States Patent
Gasso et al.

(10) Patent No.: US 10,850,447 B2
(45) Date of Patent: Dec. 1, 2020

(54) BUILD MATERIAL CONTAINER

(71) Applicant: HEWLETT-PACKARD DEVELOPMENT COMPANY, L.P., Houston, TX (US)

(72) Inventors: Xavier Gasso, Barcelona (ES); Carlos Martinez Castellanos, Sant Cugat del Valles (ES); Ivan Ferrero, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/038,812

(22) Filed: Jul. 18, 2018

(65) Prior Publication Data
US 2019/0030810 A1 Jan. 31, 2019

(30) Foreign Application Priority Data
Jul. 28, 2017 (EP) ..................................... 17382515

(51) Int. Cl.
*B29C 64/255* (2017.01)
*B33Y 30/00* (2015.01)
*B33Y 40/00* (2020.01)
*B29C 64/307* (2017.01)
*B29C 64/357* (2017.01)
(Continued)

(52) U.S. Cl.
CPC .......... *B29C 64/255* (2017.08); *B29C 64/153* (2017.08); *B29C 64/307* (2017.08);
(Continued)

(58) Field of Classification Search
CPC ... B29C 64/255; B29C 64/307; B29C 64/357; B29C 64/153; B29C 64/259;
(Continued)

(56) References Cited

U.S. PATENT DOCUMENTS 3,352,472 A * 11/1967 Cummings ............ B65D 81/18
229/120
4,401,239 A * 8/1983 Thomassen .......... B65D 77/065
222/183
(Continued)

FOREIGN PATENT DOCUMENTS

CN 103128091 6/2013
CN 2033445500 12/2013
WO WO-2012173603 12/2012

OTHER PUBLICATIONS

"New Strategies for Powder Compaction in Powder-based Rapid Prototyping Techniques"; 2013; http://www.sciencedirect.com/science/article/pii/S2212827113001741.

*Primary Examiner* — Christopher R Demeree
(74) *Attorney, Agent, or Firm* — EIP Partnership LLP

(57) ABSTRACT

Certain examples of a build material container for a three-dimensional printing system is described. The build material container has an external casing and an internal compartment within the external casing. The internal compartment may have a reservoir to store build material, where the reservoir has a channel structure, and a surround that encloses the reservoir. A partition is provided within which the channel structure is mounted, the partition forming an upper surface of the internal compartment and being independent from the external casing and the surround. The partition restricts access to the internal compartment and collects build material during use of the channel structure.

20 Claims, 27 Drawing Sheets

(51) Int. Cl.
*B29C 64/153* (2017.01)
*B65D 5/20* (2006.01)
*B65D 5/48* (2006.01)
*B65D 5/50* (2006.01)

(52) U.S. Cl.
CPC ............ *B29C 64/357* (2017.08); *B33Y 30/00* (2014.12); *B33Y 40/00* (2014.12); *B65D 5/2052* (2013.01); *B65D 5/48* (2013.01); *B65D 5/503* (2013.01)

(58) Field of Classification Search
CPC ......... B29C 64/40; B33Y 30/00; B33Y 40/00; B65D 5/48; B65D 5/2052; B65D 5/503; B65D 77/065; B65D 77/067; B65D 77/06; B65D 77/062; B65D 77/064; H05K 2203/013; H05K 3/102
USPC .............. 229/120.18, 117.3, 117.27, 117.35; 118/308; 141/114; 222/94; 264/109, 264/497; 427/333
See application file for complete search history.

(56) References Cited

U.S. PATENT DOCUMENTS

| | | | | |
|---|---|---|---|---|
| 5,085,346 A * | 2/1992 | Wright | ................... | B65D 77/06 222/143 |
| 5,179,982 A * | 1/1993 | Berube | ................ | B65B 31/003 141/113 |
| 5,387,380 A * | 2/1995 | Cima | ..................... | B05C 19/04 264/69 |
| 5,599,581 A * | 2/1997 | Burton | .................. | B05B 7/1404 118/308 |
| 5,826,752 A * | 10/1998 | Latimer | ............... | B65D 5/5405 222/105 |
| 6,280,014 B1 * | 8/2001 | Sharma | ................ | B41J 2/16552 347/28 |
| 6,327,869 B1 * | 12/2001 | Shapiro | ................... | F16K 11/07 141/114 |
| 6,519,436 B2 * | 2/2003 | Katsuyama | ............ | B65D 77/06 229/117.27 |
| 6,648,218 B2 * | 11/2003 | Katsuyama | ........ | G03G 15/0874 220/495.06 |
| 7,077,309 B2 * | 7/2006 | Andrews, Sr. | ..... | B65D 5/46104 229/117.14 |
| 7,571,835 B2 * | 8/2009 | Hill | .......................... | B65D 5/10 222/105 |
| 7,828,022 B2 | 11/2010 | Davidson et al. | | |
| 8,374,529 B2 | 2/2013 | Kuge et al. | | |
| 8,844,450 B2 * | 9/2014 | Dull | ..................... | A01C 23/008 111/120 |
| 10,071,422 B2 * | 9/2018 | Buller | ................... | B29C 64/307 |
| 10,315,252 B2 * | 6/2019 | Symeonidis | .......... | B22F 3/1055 |
| 2003/0201280 A1 | 10/2003 | Geshay | | |
| 2008/0241404 A1 | 10/2008 | Allaman et al. | | |
| 2014/0252075 A1 | 9/2014 | Ouillette, Jr. | | |

* cited by examiner

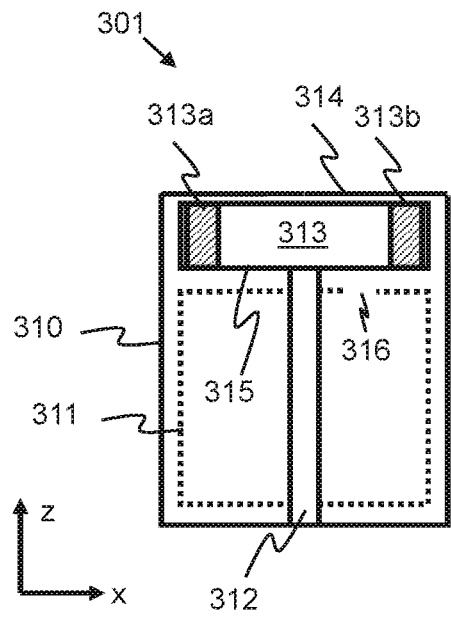
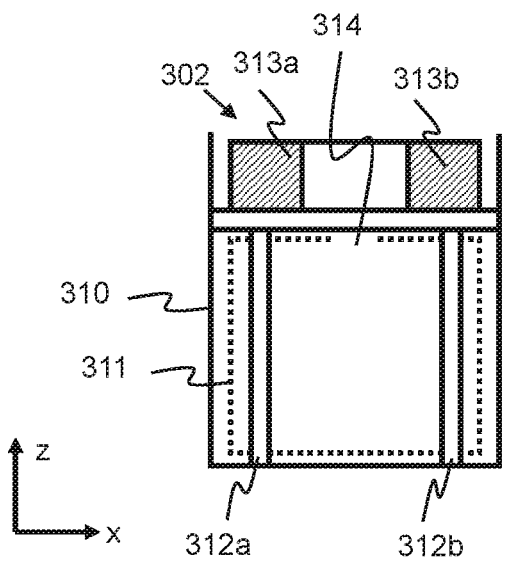
FIG. 3A
FIG. 3B
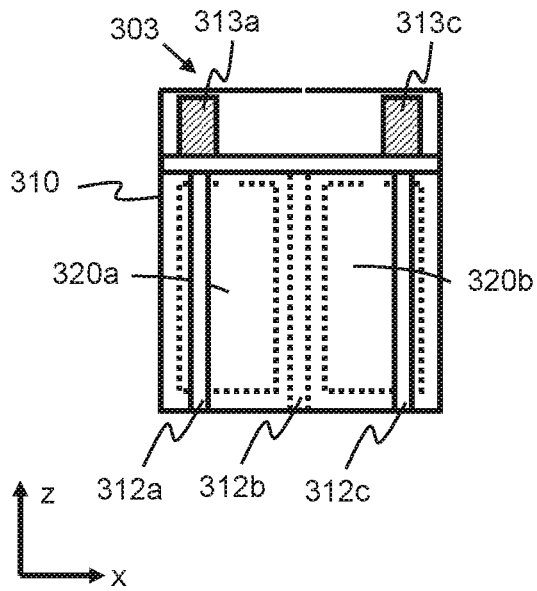
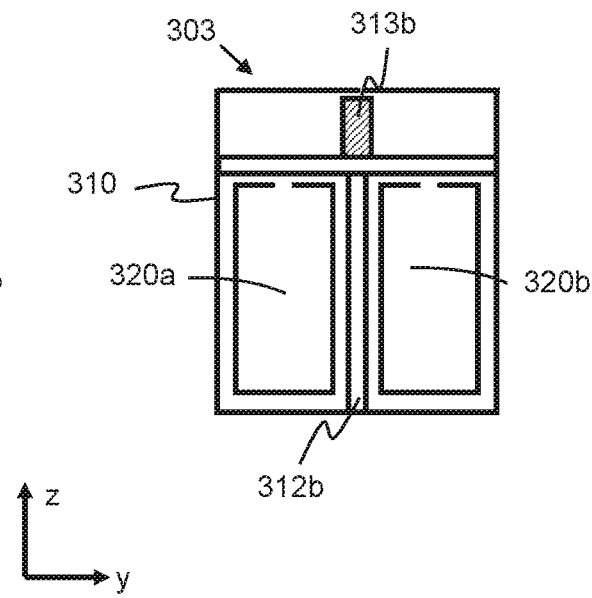
FIG. 3C
FIG. 3D

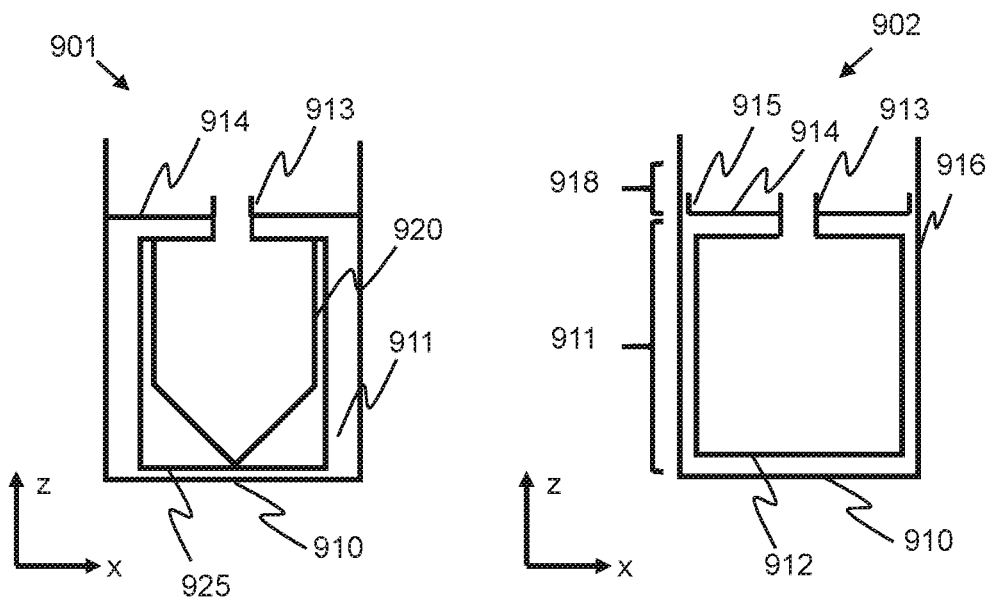
FIG. 9A
FIG. 9B
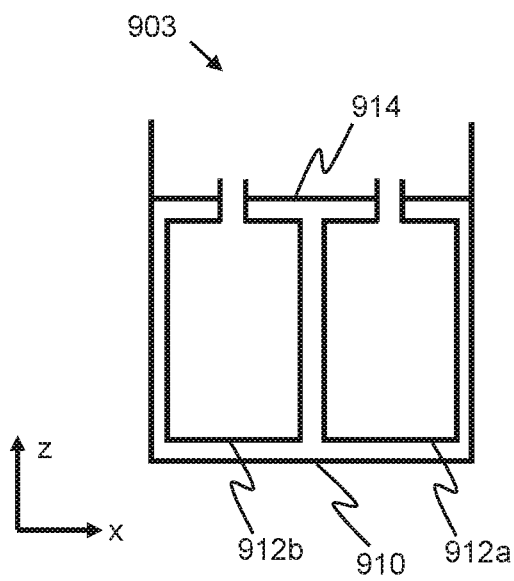
FIG. 9C

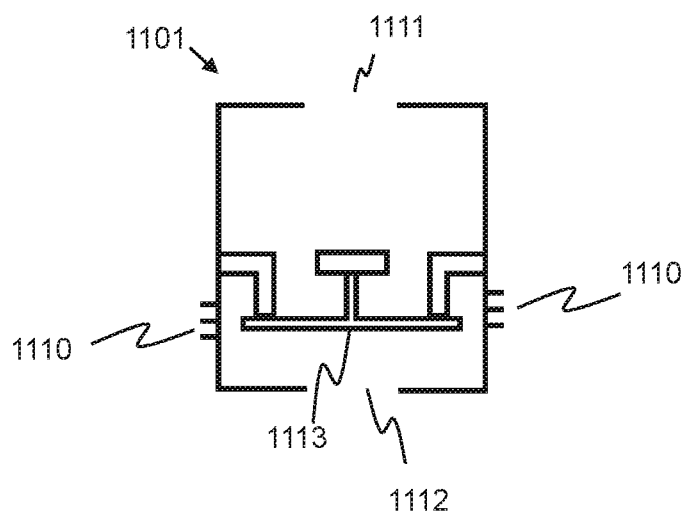
FIG. 11A
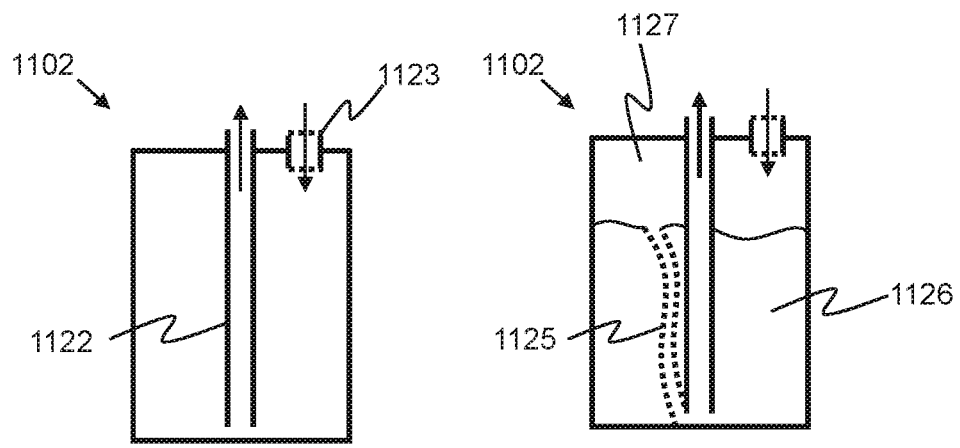
FIG. 11B     FIG. 11C

BUILD MATERIAL CONTAINER

BACKGROUND

Additive manufacturing techniques, such as three-dimensional printing, relate to techniques for making three-dimensional objects of almost any shape from a digital three-dimensional model through additive processes. In these processes, three-dimensional objects are generated on a layer-by-layer basis under computer control. A large variety of additive manufacturing technologies have been developed, differing in build materials, deposition techniques and processes by which the three-dimensional object is formed from the build material. Such techniques may range from applying ultraviolet light to photopolymer resin build material, to melting semi-crystalline thermoplastic build materials in powder, or powder-like, form, to electron-beam melting of metal powder build material. Other examples of build material include short fiber build material.

Additive manufacturing processes usually begin with a digital representation of a three-dimensional object to be manufactured. This digital representation is virtually sliced into slices by computer software or may be provided in pre-sliced format. Each slice represents a cross-section of the desired object. In some examples, the slices are sent to an additive manufacturing apparatus, which in some instances is known as a three-dimensional printer. In other examples, slicing is performed by the three-dimensional printer. In powder-based 3D printing systems the 3D printer forms successive layers of build material on a build platform and each layer is selectively solidified, based on the received slice data. This process is repeated until the object is completed, thereby building the object layer-by-layer. Other 3D printing technologies may form objects in a different manner, for example by directly depositing material based on the slice data.

The build material from which the object is manufactured may vary depending on the manufacturing technique and may for example comprise dry powders or powder-like material.

BRIEF DESCRIPTION OF THE DRAWINGS

Various example features will be apparent from the detailed description which follows, taken in conjunction with the accompanying drawings, wherein:

FIGS. 3A to 3D are schematic cross sections showing example build material containers with load bearing elements and stiffening members;

FIGS. 9A to 9C are schematic cross sections showing example build material containers with partitions;

FIG. 11A is a schematic cross section of an example gas inlet structure;

FIGS. 11B to 11G are schematic cross sections of an example build material reservoir during use;

DETAILED DESCRIPTION

Figure 1A:
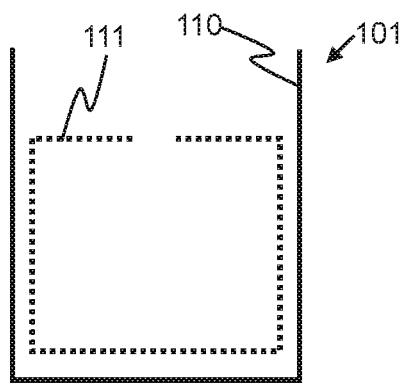
FIGS. 1A to 1C are schematic cross sections showing an example build material container and reservoir.

Three-dimensional objects can be generated using additive manufacturing techniques. The objects may be generated by solidifying portions of successive layers of build material. The build material can be powder-based and the properties of generated objects may be dependent upon the type of build material and the type of solidification. In some examples, solidification of the powder material is enabled using a liquid binding agent, such as an adhesive. In further examples, solidification may be enabled by temporary application of energy to the build material, for example using a focused laser beam. In certain examples, liquid fusing agents are applied to build material, wherein a fusing agent is a material that, when a suitable amount of energy is applied to a combination of build material and fuse agent, causes the build material to heat up, to melt, fuse and solidify. Other agents may also be used, e.g. agents that inhibit or modify a level of fusing when selectively deposited in certain areas. In other examples, other build materials and other methods of solidification may be used. In certain examples, the build material includes paste material, slurry material or liquid material. Certain examples presented herein describe examples of build material containers which contain and deliver build material to the additive manufacturing process. In examples, the build material may be dry, or substantially dry, powder.

In one example the build material used in the additive manufacturing process of this disclosure is a powder that has an average volume-based cross-sectional particle diameter size of between approximately 5 and approximately 400 microns, between approximately 10 and approximately 200 microns, between approximately 15 and approximately 120 microns or between approximately 20 and approximately 70 microns. Other examples of suitable, average volume-based particle diameter ranges include approximately 5 to approximately 70 microns, or approximately 5 to approximately 35 microns. In this example a volume-based particle size is the size of a sphere that has the same volume as the powder particle. With "average" it is intended to explain that most of the volume-based particle sizes in the container are of the mentioned size or size range but that the container may also contain particles of diameters outside of the mentioned range. For example, the particle sizes may be chosen to facilitate distributing build material layers having thicknesses of between approximately 10 and approximately 500 microns, or between approximately 10 and approximately 200 microns, or between approximately 15 and approximately 150 microns. One example of an additive manufacturing system may be pre-set to distribute build material layers of approximately 80 microns using build material containers that contain powder having average volume-based particle diameters of between approximately 40 and approximately 60 microns. For example, the additive manufacturing apparatus can be configured or controlled to form powder layers having different layer thicknesses.

Suitable powder-based build materials for use in example containers of this disclosure include at least one of polymers, crystalline plastics, semi-crystalline plastics, polyethylene (PE), polylactic acid (PLA), acrylonitrile butadiene styrene (ABS), amorphous plastics, Polyvinyl Alcohol Plastic (PVA), Polyamide, thermo(setting) plastics, resins, transparent powders, colored powders, metal powder, ceramics powder such as for example, glass particles, and/or a combination of at least two of these or other materials, wherein such combination may include different particles each of different materials, or different materials in a single compound particle. Examples of blended build materials include alumide, which may include a blend of aluminum and polyamide, multi-color powder, and plastics/ceramics blends. Blended build material may comprise two or more different respective average particle sizes.

As noted above, in other examples, the build material comprises fibers. These fibers may for example be formed by cutting extruded fibers into short lengths. The length may be selected to allow effective spreading of the build material onto a build platform. For example, the length may be approximately equal to the diameter of the fibers.

A particular batch of build material for use in an additive manufacturing process may be "virgin" build material or "used" build material. Virgin build material should be considered to be build material which has not previously been used in any part of an additive manufacturing process, and/or which has not passed through any part of a three-dimensional printing system. An unopened supply of build material as supplied by a build material manufacturer may therefore contain virgin build material. By contrast, used build material is build material which has previously been supplied to a three-dimensional printing system for use in an additive manufacturing process but which has not been solidified during the process. For example, the used build material may be produced during a thermal-fusing, three-dimensional printing operation, in which powder build material is heated to close to its melting temperature for a period of time which may be sufficient to cause material degradation of the powder. In this respect, it will be understood that not all of the build material supplied to a three-dimensional printing system for use in an additive manufacturing process may be used and/or incorporated into a three-dimensional printed article. At least some of the non-solidified build material recovered during or after completion of a 3D print job may be suitable for reuse in a subsequent additive manufacturing process. Such build material may be stored, for example internally or externally, to the three dimensional printing system for subsequent use. The used build material may be mixed with virgin build material for subsequent printing routines. The mixing proportion may be variable, for example based on powder properties. In one example, a mix of 80% used and 20% virgin build material may be used for prototyping, with 100% virgin build material being used for critical objects. In another example, a mix of 80% used and 20% virgin powder is used for production parts, with a higher proportion of used powder being used for prototyping. Build material containers may be used to supply recycled or reconditioned (i.e. used but unsolidified) build material in addition to, or instead of, virgin (i.e. unused) build material. In certain cases, build material of varying qualities may be supplied, e.g. different build material reservoirs may supply different grades of build material that each adhere to different quality specifications. In some examples, used build material is returned to a supplier of build material. The supplier may then provide reconditioned used build material, or a mixture of reconditioned used build material and virgin build material, at a lower cost than pure virgin build material. Different grades of build material may be adapted for different uses, e.g. recycled or reconditioned build material may be used for prototyping, and build material with a large proportion of virgin build material (e.g. greater than 50-80%) may be used for production.

Certain examples described herein provide ways to supply build material to a three-dimensional printing system, e.g. a three-dimensional printer or build material processing station for a three-dimensional printer. Certain examples are directed towards build material containers and reservoirs that allow build material to be transported between locations, and stored until use. Certain examples are particularly suited to holding and storing large volumes of build material, e.g. for high throughput additive manufacturers. Certain examples enable large volumes (e.g. around 1-2 $m^3$) of build material to be safely filled, transported and supplied. Certain examples are also designed to be recyclable and to minimize waste.

FIGS. 1A to 1I introduce a set of structures that may be used, individually or in combination, to form a build material container.

Figure 1B:
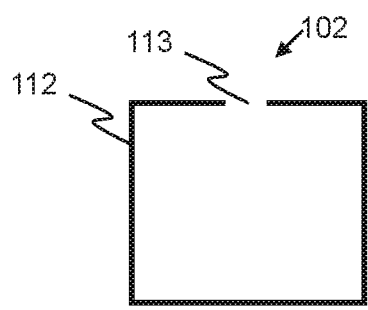
Figure 1C:
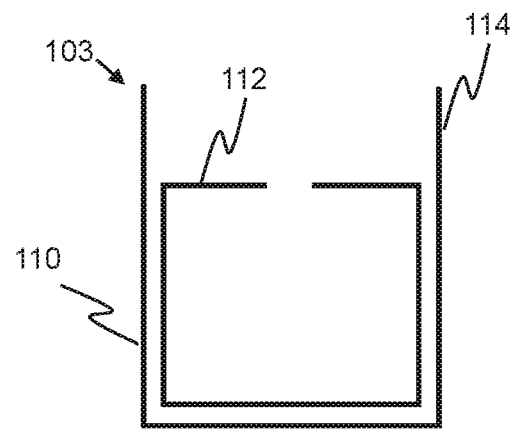

FIGS. 1A to 1C show certain aspects of a build material container according to examples.

FIG. 1A schematically shows a build material container 101 that comprises an external casing 110 and an internal space or compartment 111 for receiving a build material reservoir. A cross section of the external casing 110 is shown. The external casing 110 may be any three-dimensional shape. It may be polyhedral, such as a cuboid, a prism, or a pyramid. It may be constructed from a variety of materials including, amongst others, corrugated media or board, polymers, and molded natural fibers.

FIG. 1B schematically shows a cross-section of a build material reservoir 112 or sub-container according to an example. The reservoir 112 is configured to fit into an internal space 111 of an external casing 110. In use, the build material reservoir 112 holds or stores build material, e.g. of the form described above. As such, the external casing in the present example is "external" with reference to the build material reservoir (e.g. is outside said reservoir). In certain examples, the external casing described herein may be packaged within additional casing or packaging, e.g. additional containers for shipping and/or wrapped in protective film.

The build material reservoir 112 may comprise a container with a channel structure 113 to allow access to the build material. The container may be sealed before use. The channel structure 113 may comprise an outlet structure for extracting build material from the build material reservoir 112 or an inlet structure for supplying build material to the build material reservoir 112. In one case, a build material reservoir 112 may comprise multiple access channels, e.g. an outlet structure and an inlet structure. In certain cases, the build material reservoir 112 may also comprise gas flow valves, e.g. to let a gas into or out of the reservoir. Although the build material reservoir 112 has a square cross-section indicating a cubic structure in this example, it may have any three-dimensional shape, e.g. a rigid polyhedral arrangement or flexible bag-like structure. Similarly, the channel structure 113 is shown at the top of the build material reservoir 112 for ease of example, it may be located in another location in other examples.

FIG. 1C schematically shows a cross-section of a build material reservoir 112 mounted within an external casing 110. The build material reservoir 112 may be structured to fit within the dimensions of the external casing 110. In one example, the upper portions 114 of the external casing 110 may be foldable to provide an outer surface of the external casing 110 and cover the build material reservoir 112. The build material reservoir 112 may be directly mountable within the external casing 110 or may be mountable within one or more intermediate internal structures.

Figure 1D:
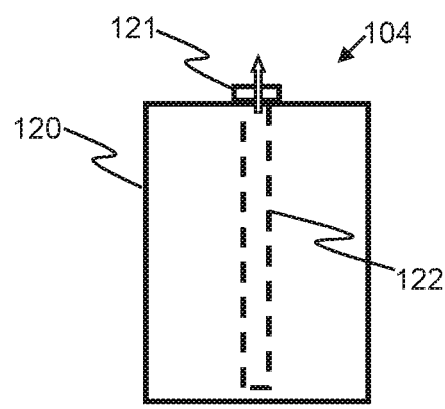
FIGS. 1D to 1F are schematic cross sections showing examples of a build material reservoir.
Figure 1E:
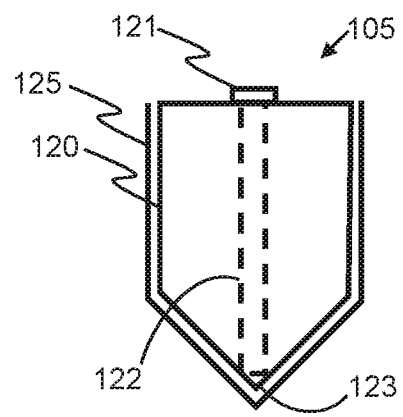
Figure 1F:
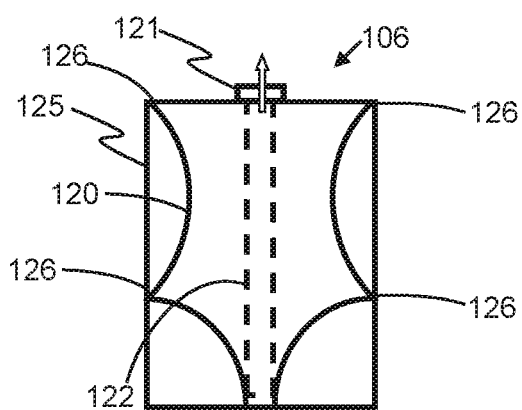

FIGS. 1D to 1F show certain aspects of a build material reservoir according to examples. For example, this may be the build material reservoir 112 shown in FIGS. 1A to 1C.

FIG. 1D schematically shows a build material reservoir 104 according to an example. The build material reservoir 104 comprises an outer structure 120, an outlet structure 121 and an internal aspiration channel 122 coupled to the outlet structure 121. The outer structure 120 may comprise a polymer box or bag of a predetermined thickness. In the latter case, a bag may be shaped by molding and/or heat sealing, amongst other methods of manufacture. In the present example, the outlet structure 121 is arranged to be coupled to an aspiration system. The aspiration system may form part of a supply system for a three-dimensional printing system, i.e. a system configured to supply the three-dimensional printing system with build material. The outlet structure 121 may be formed as part of the outer structure 120 and/or may be attached to the outer structure, e.g. via a coupling mechanism such as a threaded portion of the outer structure 120. The aspiration channel 122 may comprise a rigid closed channel, such as a polymer tube that is fixed to the outlet structure 121. The aspiration channel 122 may end in an opening at a base of the outer structure 120. In this manner, a low pressure such as a vacuum that is applied to the outlet structure 120 may cause a change in pressure in the aspiration channel 122, i.e. a lowering of pressure. If the build material reservoir 104 contains build material, the low pressure at the opening of the aspiration channel 122 may cause build material to be sucked up the aspiration channel 122 and to be extracted via the outlet structure 121. In one case, the aspiration channel 122 may be separate from the outlet structure 121. In this case, the outlet structure 121 may be connectable to the aspiration channel 122. In another case, the aspiration channel 122 and the outlet structure 121 may form two parts of a common structure. The aspiration channel 122 aids the extraction of build material from the build material reservoir 104 in certain examples. In other examples, e.g. where the outlet structure 121 is located at a base of the build material reservoir 104, build material may be extracted from the outer structure 120 without the aspiration channel 122.

FIG. 1E schematically shows a build material reservoir 105 according to an example that is provided with a surround 125. The build material reservoir 105 comprises components similar to build material reservoir 104. In this example, the outer structure 120 may comprise a deformable structure, such as a flexible polymer bag. The deformable structure comprises at least one deformable side wall. A deformable structure assists in emptying the build material reservoir 104 by having the at least one deformable side wall deform inwards (e.g. collapse) when the pressure inside the outer structure 120 is below a given value (e.g. when a vacuum is applied via outlet structure 121. The deformable structure may also deform due to the presence of build material within the structure, e.g. the presence of build material may exert an outwards pressure that is applied to the side walls. An extent to which a deformable structure deforms outwards may be limited by the surround and/or a tension in the deformable structure.

The surround 125 surrounds the outer structure 120. It may be formed from a material with a higher stiffness that the outer structure 120, in which case it may be used to support the outer structure 120. In one case, the outer structure 120 may be physically attached, at least partially, to the surround 125, e.g. through a fastening substance such as a glue or tape. The outer structure 120 may be supplied in a flat or folded form attached to the surround 125, or may be inserted into the surround 125. In FIG. 1E, the outer structure 125 ends in a vertex 123. The aspiration channel 122 may be positioned with its end at the vertex 123. In three dimensions the vertex 123 may form the point of a polyhedral portion at a base of the outer structure 120, e.g. in the form of a cone or pyramid. The polyhedral portion may have a height that is a proportion of the height of the outer structure 120, e.g. a third or a quarter of the height. The height of the polyhedral portion may be determined based on an angle of as described with reference to later examples. A shape of the outer structure 120 may be formed by heat sealing sides of the outer structure 120. In one example, a shape of a deformable outer structure 120 may be at least partially expanded, by insertion of the aspiration channel 122 via the outlet structure 121 or another opening (such as 113 in FIG. 1B), e.g. insertion of the aspiration structure may apply a force to a base of the deformable structure and thereby help extend it to, or near, its fullest extent in the direction of the insertion. In FIG. 1E, the surround 125 matches and supports the vertex 123. Having a vertex located at the lowest operational point of the structure 120 enables build material to be efficiently extracted from the build material reservoir 105, e.g. the build material is fed towards the vertex by gravity and thus collects around the vertex in the interior of the outer structure 120 where it may be extracted using the aspiration channel 122. Additionally, at least one deformable side of the outer structure 120 may also feed build material towards the vertex.

FIG. 1F is a schematic illustration of an example build material reservoir 106 showing how the outer structure 120 may deform in use. Again, in implementations the shape of the outer structure 120 may vary from that shown in the Figure. In FIG. 1F, the outer structure 120 is fixed to the surround 125 in a number of locations 126. In one case, the surround may be open at the top, e.g. the surround may have a number of sides to surround the outer structure 120, plus base elements to surround any flat or polyhedral lower portion. When a low pressure such as a vacuum is applied at the outlet structure 121 this may lower the pressure within the outer structure 120, causing the outer structure to deform inwards as shown, apart from where it is constrained by any fixation locations 126.

Figure 1G:
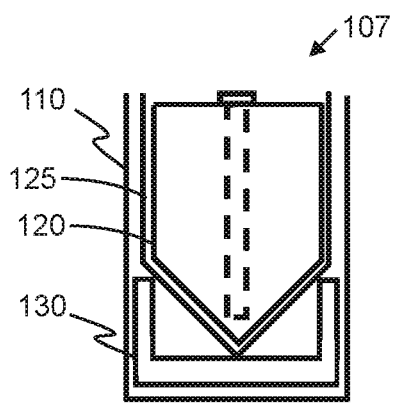
FIGS. 1G to 1I are schematic cross sections showing examples of a support structure within a build material container.

FIG. 1G is a schematic illustration of an example build material container 107 showing how a build material reservoir, show as 105 in FIG. 1E, may be mounted within the external casing 110 shown in FIGS. 1A and 1C. In FIG. 1G a support structure 130 is provided that accommodates the vertex of the outer structure 120 of the build material reservoir. In certain cases, such as that of FIG. 1E, the support structure 130 may accommodate the vertex of the surround 125 around the outer structure 120. Although a conical or pyramidal base is shown in FIG. 1G, the support structure 130 may accommodate other three-dimensional shapes. In certain cases, the support structure 130 may be molded to fit a particular three-dimensional shape of either the outer structure 120 or the surround 125.

Figure 1H:
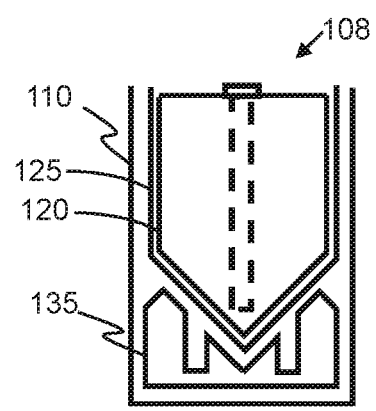
Figure 1I:
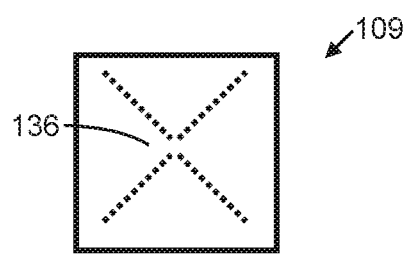

FIG. 1H shows a support structure 135 for a build material container 108. The support structure 135 in this example comprises a polyhedral indentation, e.g. a valley or molded concavity, in an upper portion of the support structure 135. The polyhedral indentation is configured to receive a base of the outer structure 120 for the build material container. A base of the support structure 135 is arranged to rest on a planar surface, such as a base of the external casing 110. In certain cases, the support structure 135 may be dimensioned to be accommodated within a base of a cuboid external casing 110. The support structure 135 may be constructed from a molded material, such as polymer or natural fiber (e.g. board or paper based). The latter material enables recycling of the support structure 135 following use. FIG. 1I shows the support structure 135 from above and featuring an indentation or concavity 136.

Figure 2A:
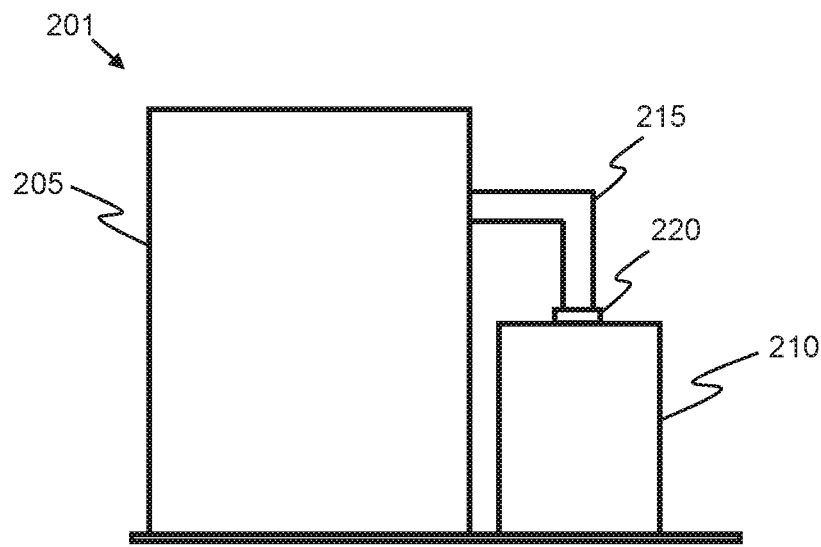
FIGS. 2A and 2B are schematic drawings showing example three-dimensional printing systems.
Figure 2B:
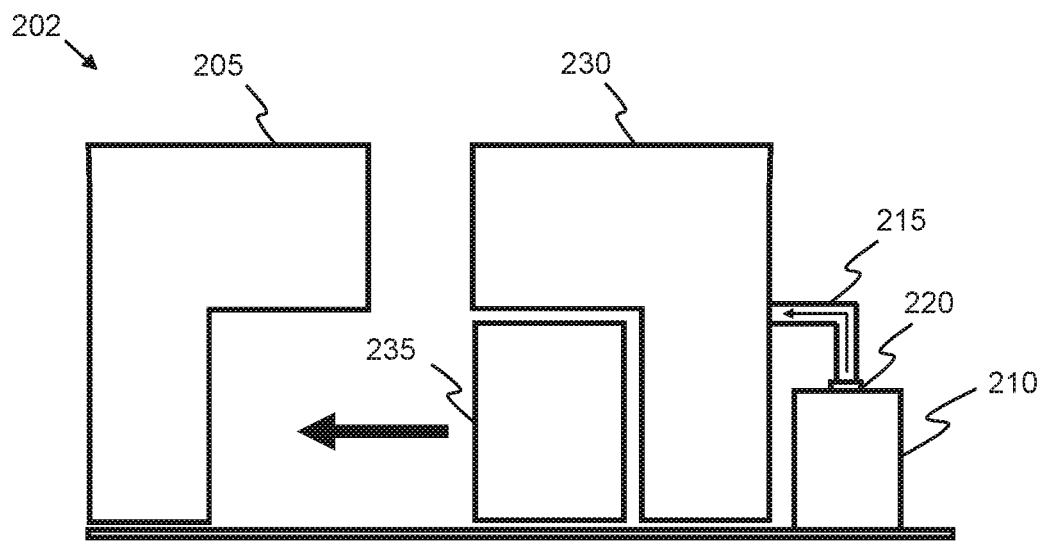

FIGS. 2A and 2B show example three-dimensional printing systems that may be used with the build material container examples of FIGS. 1A to 1I.

FIG. 2A shows a three-dimensional printing system 201 comprising a three-dimensional printer 205, a build material container 210, and a build material transport system 215 for transporting build material between the build material container 210 and the three-dimensional printer 205. The three-dimensional printing system 201 may be an additive manufacturing system for generating three-dimensional objects using build material stored in the build material container 210. The three-dimensional printer 205 may comprise a three-dimensional printing part and a separate build material management part. Alternatively, the three-dimensional printer 205 may comprise a three-dimensional printing module and a build material management module incorporated within a single apparatus. The transport system 215 may comprise an aspiration system (not shown), which generates a suction, or vacuum, pressure to extract build material from the build material container 210 for delivery to the three-dimensional printer 205 by pneumatic transport. Connection between the transport system 215 and the build material container 210 is facilitated by a build material outlet structure 220. This may comprise the outlet structure 121 described with reference to FIGS. 1D to 1F. The build material container 210 may also provide an aspiration channel through which build material stored in the container 210 may be extracted or "aspirated" via the transport system 215 to the three-dimensional printer 205. According to some examples, the transport system 215 is provided with a nozzle structure (not shown) to connect to the outlet structure 220 of the container 210 in a sealable manner (e.g. a gas/fluid seal), thereby facilitating pneumatic transport of the build material from the build material container 210 to the three-dimensional printer 205.

FIG. 2B shows one example of a three-dimensional printing system 202 that comprises a three-dimensional printer 205 and a separate build material management station 230 (sometimes referred to as a "processing station"). If the build material management station 230 is arranged to supply the three-dimensional printer 205 with build material it may be referred to as a "supply system". In FIG. 2B, the build material management station 230 comprises the transport system 215 to extract build material from the build material container 210 via the outlet structure 220. In certain cases, the build material management station 230 may be arranged, additionally or alternatively, to fill, or transfer build material to, the build material container 210 via an inlet structure using the transport system 215. In FIG. 2B, a build unit 235 such as a moveable trolley is filled with build material by the build material management station 230 and then is moved to the three-dimensional printer 205 for the printing of an object. For example, the build unit 235 may be couplable to both the build material management station 230 and the three-dimensional printer 205. In other examples, the build unit 235 may be fixed and/or have a constrained movement path, e.g. comprise a moveable carriage. Although the three-dimensional printing system 202 is shown as having separate units in FIG. 2B, in certain implementations these may form separate sections of a single apparatus. The build material management station 230 may manage build material extracted from build material container 210 in order to fill the build unit 235 with build material for use in a subsequent three-dimensional printing operation. In certain cases, the build unit 235 may be returnable to the build material management station 230 following printing. For example, the build material management station 230 may be used to remove non-solidified build material following completion of a printing operation. Non-solidified build material may be used as recycled build material for future printing, e.g. used to fill the build unit 235 for future objects to be built. In one case, the build material management station 230 may mix "used" build material with "virgin" build material previously extracted from the build unit 235 in user-defined proportions. The build material management station 230 may comprise storage units to store both "used" and "virgin" build material.

FIGS. 3A to 3F schematically depict a set of structures 301-305 that may be used, individually or in combination, to form a build material container according to certain examples. As will be made clear, aspects of the structures 301-305 correspond to similar aspects of the structures 101-109 described above in relation to FIGS. 1A to 1I. Unless stated otherwise, in some examples such aspects have form and function as described above.

FIG. 3A schematically shows a build material container 301 for a three-dimensional printing system. FIG. 3A is presented as a schematic vertical cross section from one side. The container 301 comprises an external casing 310 and a lower compartment 311 to receive a build material reservoir. As described above in relation to FIGS. 1A to 1I, the build material reservoir may, in some examples, comprise a deformable structure having an inlet and/or outlet, and an aspiration channel within the deformable structure that is coupled to the outlet.

Similarly as described above in relation to FIG. 1A, the external casing 310 may be any three-dimensional shape and may be constructed from a variety of materials including corrugated media or board, polymers and molded natural fibers.

The container 301 comprises at least one load-bearing element 312. In FIG. 3A, the load-bearing element 312 is aligned with an axis of the lower compartment 311. In FIG. 3A, the element 312 is also shown as located centrally within the lower compartment 311 and aligned with the vertical axis thereof. In other examples, the element 312 may be non-central and/or have a non-vertical alignment. The axis may represent a height dimension of the build material container, i.e. a dimension wherein gravitational loads are applied. The container 301 comprises an upper compartment 313 below an upper surface 314 of the external casing 310. The upper compartment 313 and the lower compartment 311 are separated by a lower surface 315, the at least one columnar load-bearing element 312 being arranged below the lower surface. Although a columnar load-bearing element is shown in FIG. 3A for ease of explanation, the load-bearing element 312 may be arranged to distribute a vertical load from the lower surface 315 to a base of the build material container using a non-columnar structure, e.g. using arches and/or diagonal members. When using non-columnar structures, the at least one load-bearing element 312 may not be aligned with the axis of the lower compartment 311 to support loading on top of the build material container 301.

In some examples, the upper and lower surfaces are formed from the same material as the external casing 310. For example, the upper and/or lower surfaces may be formed from one or more flaps of the external casing 310. Alternatively, the upper and/or lower surfaces may be formed by a piece or pieces of material separate from the external casing 310. For example, the lower surface may comprise a partition as described with reference to FIGS. 9A to 9F below.

In other examples, the upper and/or lower surfaces are formed from a different material from the external casing 310. In one such example, the external casing 310 is formed from corrugated cardboard and the upper and/or lower surfaces are formed from a polymer.

The upper compartment 313 comprises stiffening members 313a, b arranged to distribute load received from the upper surface 314 to the at least one load-bearing element 312. The stiffening members 313a, b are arranged around an aperture 316 for a channel structure of the build material reservoir. The stiffening members 313a, b distribute this load to the at least one load-bearing element 312. The stiffening members are stiffening in that they strengthen the ability of the build container to withstand vertical loads, e.g. they stiffen the upper compartment 313.

As such, a load applied to the top of the container 301 is transferred through the upper compartment 313 to the load-bearing element 312, and thereby is not applied to the channel structure or, more generally, the reservoir. This allows loads to be applied to the top of the container 301, for example by stacking additional build material containers, or other items, on top of the container 301, without damaging the channel structure or compacting build material in the reservoir. Load is thus distributed through the container 301 without affecting the build material therein. The simplicity of storing and transporting containers 301 is thus improved.

The transfer of force through the load-bearing element 312 also causes the force that is transferred through the walls of the external casing 310 to be reduced. The external casing thus has more flexibility with regard to materials and design, allowing, for example, lighter, less stiff, and generally cheaper materials to be used for the casing 310 without compromising the integrity of the container 301 or causing it to buckle.

Figure 3E:
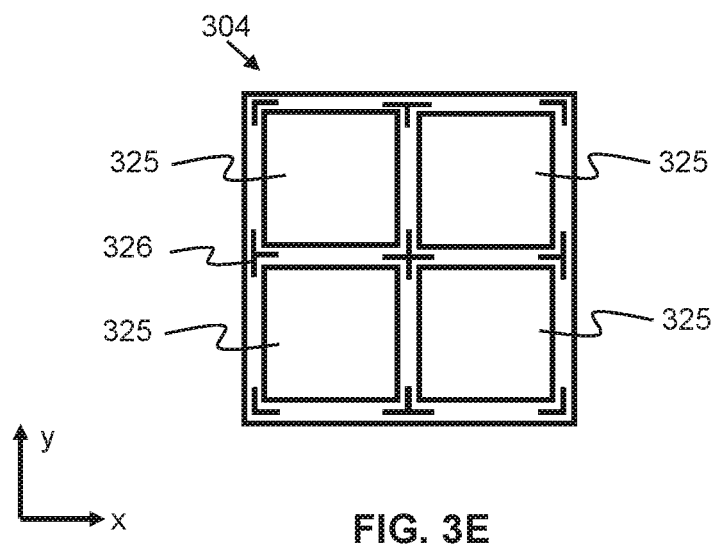
FIGS. 3E to 3F are schematic top views showing example build material containers with load bearing elements and stiffening members.
Figure 3F:
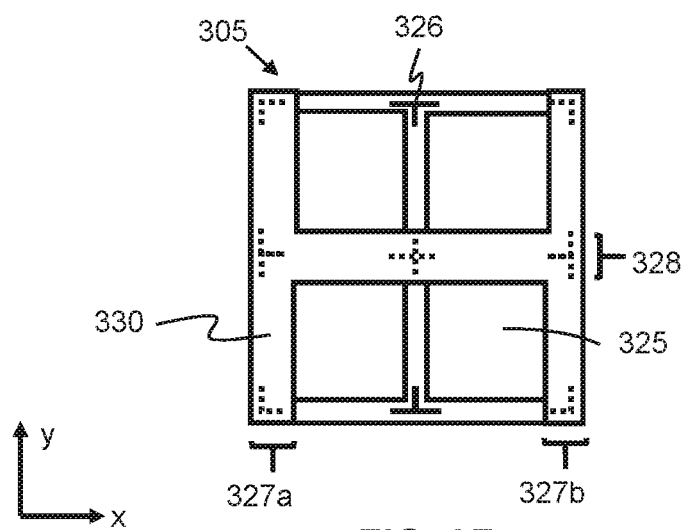

FIG. 3B shows schematically a build material container 302 according to a further example. In FIGS. 3B, 3E and 3F, upper surface 314 is omitted for clarity. Upper surface 314 may be formed from flaps of the external casing 310 that are folded over prior to transport. The container 302 comprises an external casing 310 and a lower compartment 311 as described above in relation to FIG. 3A. The container 302 further comprises a plurality of load-bearing elements 312a, 312b arranged around the exterior of the lower compartment 311, e.g. within the external casing 310. FIG. 3B shows separate parts 313a, 313b of an upper compartment 313, with one part corresponding to each load-bearing element 312a, 312b. These separate parts 313a, b comprise the aforementioned stiffening members. Increasing the number of load-bearing elements in this manner allows a load applied to the top of the container 302 to be spread more evenly, improving the strength of the container 302.

FIGS. 3C and 3D shows schematically a build material container 303 according to a further example. The container 303 comprises an external casing 310 as described above in relation to FIG. 3A. The container further comprises a plurality of build material reservoirs 320a, b for holding build material, for example as described above in relation to FIGS. 1B to 1F or the later Figures. The container 303 comprises a plurality of load-bearing elements 312a-c arranged around the build material reservoirs 320a, b. Parts 313a-c of an upper compartment act as stiffening members and each correspond to a load-bearing element 312a-c, such that load applied to the top of the container 310 is transferred via parts 313a-c of the upper compartment to the corresponding load-bearing elements 312a-c. The load is thus spread across the load-bearing elements 312a-c. FIG. 3C shows a front cross section with a front side wall removed. FIG. 3D shows a lateral cross section at a center of the container. In FIG. 3C the location of build material reservoirs 320a, b and central load-bearing element 312b behind load-bearing elements 312a, c are shown using dashes. In FIG. 3D the load-bearing elements 312a, c are not shown. In FIG. 3D, at least one load-bearing element 312b is located between the build material reservoirs. This improves the strength of the container 303 relative to a similar container in which the load-bearing elements are arranged around the edges of the container. Such an arrangement may aid compliance with drop safety tests.

For clarity, a support structure such as that shown in FIGS. 1G to 1H is not shown in FIGS. 3A to 3D. When such a support structure is supplied, the load-bearing members may be located within apertures in the support structure and/or positioned around the support structure.

In one example implementation, an external casing 310 may be 1.5 m tall (i.e. a length in a z dimension as indicated in the Figures), with a length of 1 m (i.e. a length in an x dimension as indicated in the Figures) and a width of 0.75 m (i.e. a length in a y dimension as indicated in the Figures). A height of examples may generally be within a range of 1 to 2 m and widths and lengths may be selected from a range of 0.5 to 2 m. A width and length of the external casing 310, e.g. dimensions of a horizontal cross section, may have equal or different values. A height of the upper compartment 313 (e.g. a z-dimension value) may be between 5 to 20 cm and may depend on a height of an outlet structure of a build material reservoir. As such, in these cases, load-bearing elements may have a height of between 130 to 145 cm. Stiffening members 313a, b may have a length up to or equal to a width of the external casing 310, e.g. 75 cm. A length of stiffening members 313 a, b may be less than the length of the side of external casing. Stiffening members 313a, b may have a cross-sectional height that is approximately equal to a height of the upper compartment 313, e.g. between 5 to 20 cm. Stiffening members may have a cross-sectional width that is between 5 to 20 cm, where in one case the stiffening members may comprise a cuboid with x, y and z dimensions of 10×75×6 cm. If corrugated media is used, the external casing, stiffening members, load-bearing elements and/or surfaces may have a thickness of between 2 to 10 mm. A lower support structure may have a height of around 30 to 50 cm. A lower polyhedral of a build material container may have a height of around 20 to 40 cm.

A filled build material container of the above dimensions may weigh approximately 150 to 180 kg including a weight of the build material container. An unfilled build material container may weigh between 20 to 30 kg. The reservoirs of an example unfilled build material container have a total internal volume of around 0.75 m³. If build material containers of this size are stacked, a maximum load may comprise approximately 1500 to 1800 Newtons.

It should be understood that the dimensions and loading set out above are for one example, and may vary according to different implementations.

FIG. 3E shows schematically a plan view of a build material container 304 according to an example, e.g. a horizontal cross section below the lower compartment. The container 304 may be configured in the same fashion as the container 303 described above in relation to FIGS. 3C and 3D. For clarity, the upper compartment is not shown. The container 304 comprises a plurality of individual build material reservoirs 325, arranged in a two-by-two grid formation. The container 304 further comprises load-bearing elements 326, with one such element positioned at each intersection of the two-by-two grid. This allows loads to be spread effectively across the load-bearing elements. The load-bearing elements 326 in this example are columnar.

The load-bearing elements have cross-sectional shapes corresponding to their positions within the grid, such that elements at the outer corners have a right-angled "L" shape, elements in the middle of the outer sides have a "T" shape, and the element in the middle of the grid has a "+" shape. In other examples different shaped elements may be used, and, for example, each element may have the same shape. This helps make efficient use of the internal volume available to accommodate the reservoirs 325 whilst not compromising the load bearing capability of the elements. In one case, the load-bearing elements are formed from a material similar to the external casing 310, e.g. a type of corrugated media that is folded and/or affixed into the shapes shown. In another case, the load-bearing elements are formed of a different material, e.g. one with a higher load strength such as metal or polymer. In other examples, the load-bearing elements have other cross-sectional shapes, for example circular or rectangular cross sections.

FIG. 3F shows schematically a plan view of a build material container 305 according to an example. The build material container may generally be configured as described above in relation to FIGS. 3A to 3D. The container 305 comprises build material reservoirs 325 and load-bearing elements 326, configured as described above in relation to FIG. 3D. The container 305 comprises an upper compartment 330. The upper compartment 330 has an "H" shape and is positioned above a plurality of the load-bearing elements 326. Dotted lines indicate where load-bearing elements 326 lie directly below a part of the upper compartment 330.

In FIG. 3E, the upper compartment 330 comprises two opposing stiffening members 327a, b that extend along widths of the upper surface, e.g. along a width or other horizontal dimension of the casing 310. The upper compartment 330 further comprises a stiffening member 328 that extends along a length of the upper surface. This represents an example configuration: in other examples, the upper compartment 330 comprises one or two of these stiffening members 327a, b, 328. In yet further examples, the upper compartment 330 comprises additional stiffening members.

The stiffening members 327a, b are, in some examples, folded stiffening members. In one such example, the stiffening members 327a, b are formed from folded flaps of the external casing of the container 305. As such, in certain cases, the stiffening members may be constructed from corrugated media. One or more perpendicular stiffening members 328 may then extend across the upper compartment 330 between the stiffening members 327a, b. As shown in FIG. 3E, load-bearing elements of the container 305 are arranged to receive a load from the stiffening members 327a, b, 328. The stiffening member 328 may be constructed by folding an end of a flap of the external casing inward towards the interior of the container 305. The height of the stiffening members 327, 328 may be configured to be a height of the upper compartment 330. Example dimensions are provided above.

Figure 3G:
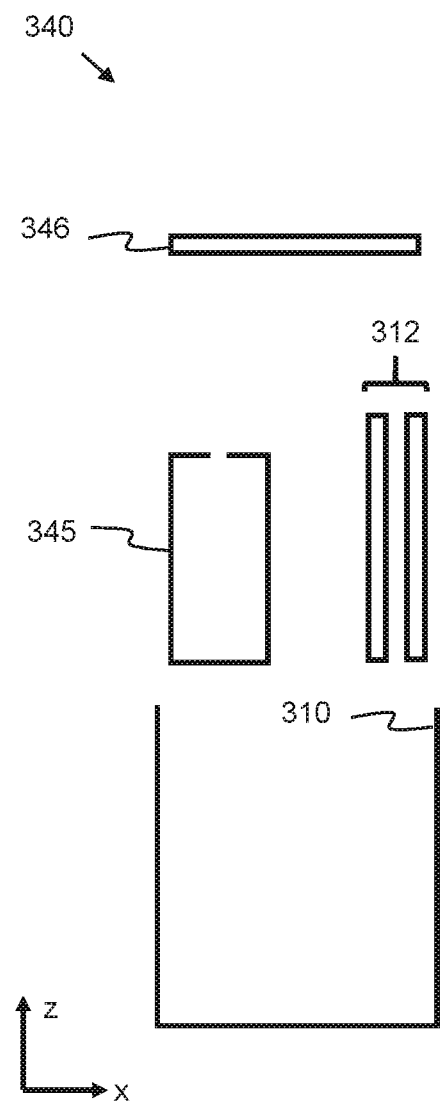
FIG. 3G is a schematic view of a kit according to an example.

FIG. 3G shows an example kit 340 for constructing a build material container for a three-dimensional printing system, for example as described above in relation to FIGS. 3A to 3E. The kit comprises an outer box 310 having a height, a length and a width. For example, the height may be a vertical (z) dimension and the length and width may be horizontal dimensions (x, y). In one case, the box may be 1×0.75×1.5 m in x, y and z dimensions. The outer box may be supplied as a net or blank to be folded and assembled, or may be supplied ready formed, e.g. as a molded polymer box. The box may have dimension ranges as discussed above.

The kit 340 also comprises an internal carton 345 for storing build material for the three-dimensional printing system, the internal carton 345 to fit within the outer box 310 and having a height less than the height of the outer box 310. The carton 345 may thus form a reservoir 320 for build material, as described above. The internal carton 345 may comprise a surround and a deformable structure as described with reference to other examples herein. The deformable structure may comprise a polymer bag that is affixed in place within the surround.

The kit comprises a planar portion 346 for fitting within the outer box 310, e.g. parallel to the base of the box 310, above the internal carton 345.

The kit 340 comprises a plurality of elongate load-bearing members 312 having a length equal to or greater than that of the internal carton 345 and less than the height of the outer box 310. These members 312 are configured to fit, in use, around the internal carton 345 within the outer box 310. In some examples, additional stiffening members are also provided as part of the kit 340. These stiffening members are arranged to fit, in use, between a surface of the outer box 310 and the planar portion 346. The stiffening members can thus be configured to distribute a load from the surface to the planar portion 346. The planar portion 346 is thus configured to, in use, receive a load from the outer box 310 and to distribute said load to the elongate load-bearing members 312.

In some examples, the stiffening members comprise portions of the outer box 310. For example, the stiffening members may comprise folded portions of the outer box 310. In other examples, stiffening members may be separate members, such as a metal or polymer reinforcement member attached to a cardboard outer box 310.

From the kit may thus be assembled a build material container such as that described above in relation to FIGS. 3A to 3E.

In one case, there is provided a plurality of build material containers as described in examples, wherein the build material containers contain build material and are stacked vertically, i.e. in the z dimension.

Figure 4A:
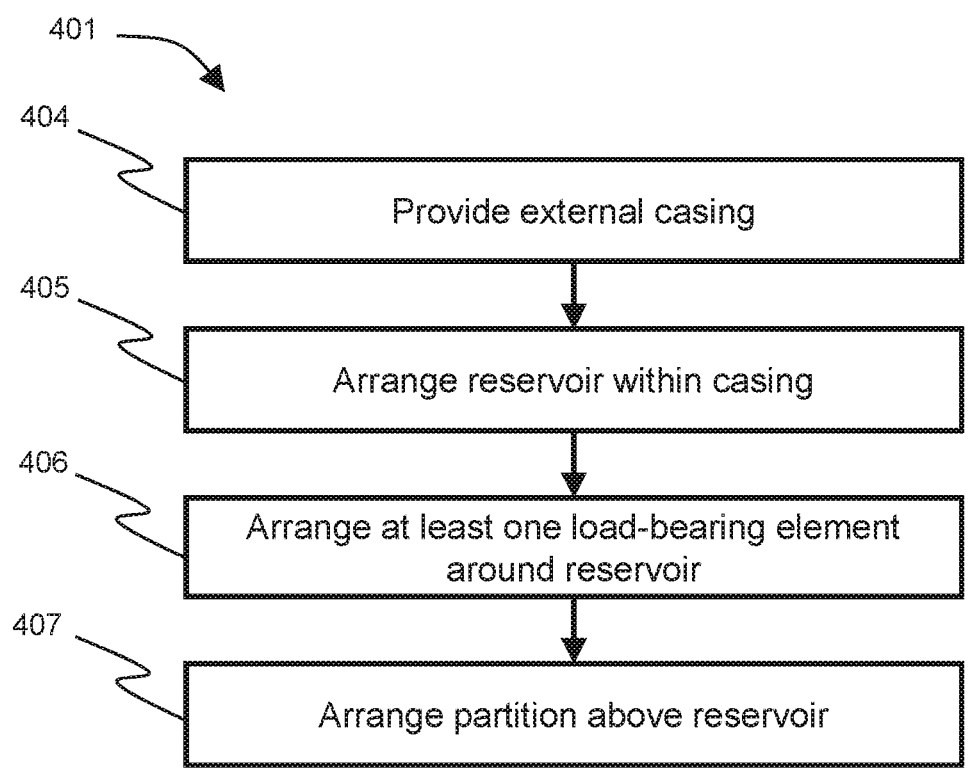
FIG. 4A is a flow diagram showing an example method for making a build material container.
Figure 4B:
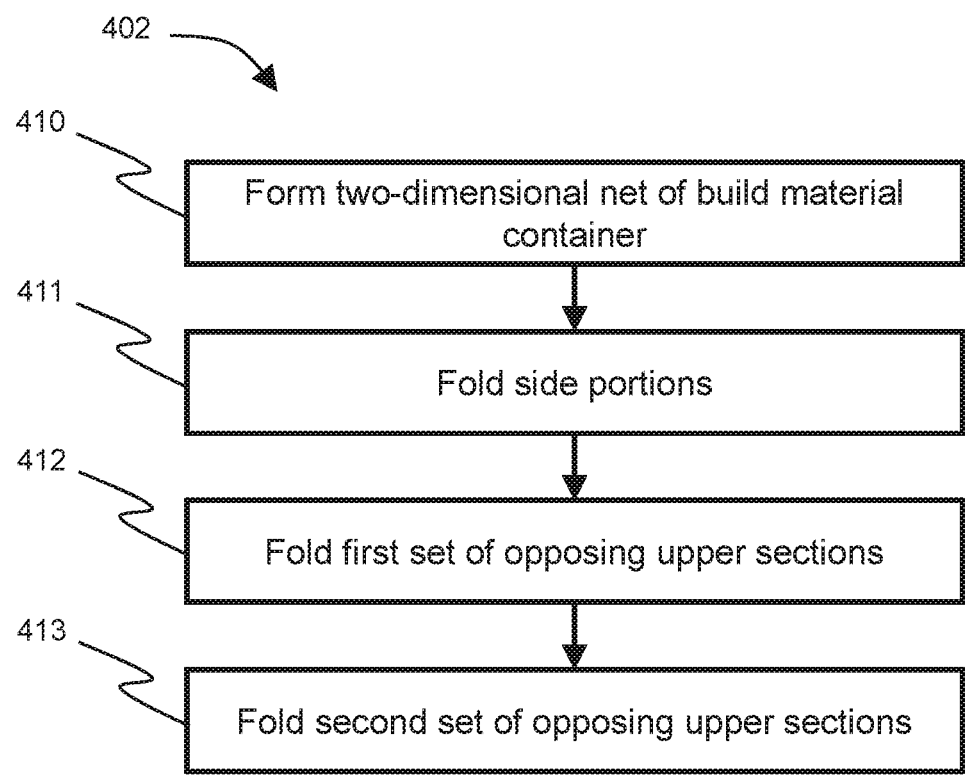
FIG. 4B is a flow diagram showing an example method for constructing a build material container.

FIGS. 4A and 4B show methods 401, 402 according to examples. FIG. 4A shows a flow diagram of a method 401, according to examples, for making a build material container for a three-dimensional printing system as described in more detail above. The method may be performed with a kit as described in the preceding paragraphs.

The method 401 comprises a block 404 of providing an external casing for the build material container. This may be the outer box of the kit. The method 401 then comprises a block 405 of arranging the build material reservoir within the external casing. This may comprise slotting a surround of the build material reservoir into an interior of the external casing or assembling the external casing around the build material reservoir. The method may comprise inserting an aspiration tube into the reservoir. At block 406, the method 401 comprises arranging at least one load-bearing element around the build material reservoir. This may comprise slotting the load-bearing elements into the interior of the external casing from an open top of the external casing. This may comprise, amongst others, one or more of: arranging load-bearing elements in the corners of the external casing, arranging one or more central load-bearing elements, and arranging load-bearing elements at the side of the external casing. Load-bearing elements may be arranged as per FIG. 3E such that each build material reservoir is surrounded by at least four load-bearing elements. At block 407, the method 401 comprises arranging a partition above the build material reservoir. The partition comprises an aperture of a channel structure of the build material reservoir, and is supported upon the at least one columnar load-bearing element. This may comprise placing the partition on top of any build material reservoirs and load-bearing elements, ensuring that the channel structures are fed through the apertures within the partition.

In some examples, the method further comprises supplying build material to the channel structure to fill the build material reservoir. Performing such supplying increases pressures within the container, and thus may be performed after arranging the load-bearing elements around the reservoir to avoid difficulty in inserting the load-bearing elements.

In certain cases, the method 401 may comprise a further block of arranging a set of stiffening members upon the partition around the channel structure, and closing the external casing. Such stiffening members are configured to transfer loads, applied to the top of the container, to the load-bearing elements. The method 401 may comprise constructing the stiffening members from upper sections of the external casing, e.g. by folding the upper sections. In other examples, the stiffening members may be supplied for fastening to the partition and/or internal side walls of the external casing.

FIG. 4B shows a flow diagram of a method 402, according to a particular example, for constructing a build material container. In examples, the build material container is as described above.

The method 402 comprises a block 410 of forming a two-dimensional net or blank of the build material container. A net or blank is a flattened form of the three-dimensional build material container that make be assembled into shape. For example, this may be formed, for example, by cutting a sheet of corrugated media and pre-scoring portions thereof to facilitate folding. The two-dimensional net or blank comprises at least one base portion and side portions having foldable upper sections, wherein a base portion is a portion useable to construct a base of the three-dimensional build material container and a side portion is a portion useable to construct a side of the three-dimensional build material container.

Figure 5:
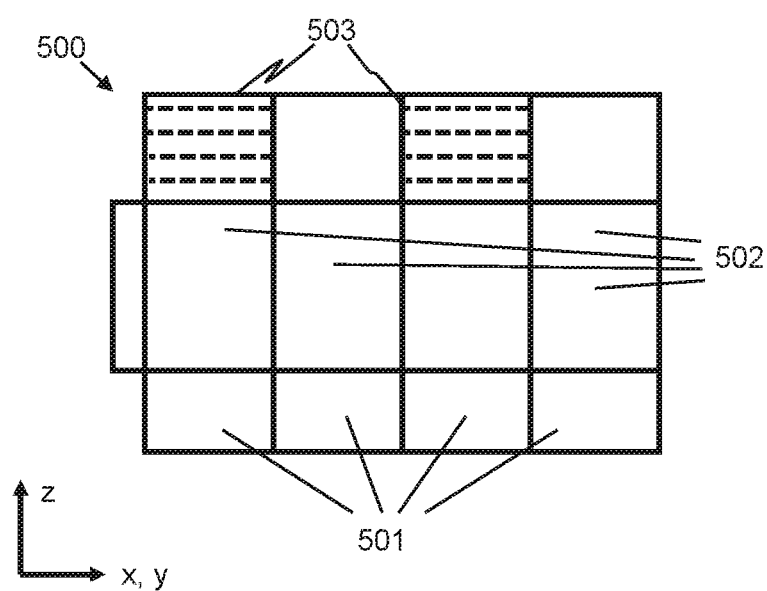
FIG. 5 is a schematic drawing showing an example blank or net for a build material container.

FIG. 5 shows a schematic representation of such a net or blank 500. The net 500 comprises base portions 501 and side portions 502. Two of the side portions have foldable upper sections 503. The base portions 501 may be folded over each other to create a base of the external casing. In other examples, the base portions may comprise a single planar portion foldably coupled to one of the side portions 502. Various configurations are possible in practice.

Returning to FIG. 4B, the method 402 comprises a block 411 of folding the side portions to generate a three-dimensional form of the build material container. This block may also involve fixing or fastening the side portions and/or base portions into place, e.g. using glue or tape. At block 412, the method 402 comprises configuring side stiffening members that extend at least along a length of the side portions. In this example, this comprises folding a first set of opposing upper sections to generate upper stiffening members that extend along opposite sides of the build material container. For example, this may comprise folding a flap into a cuboid member that is foldably coupled to the side portion and has a height corresponding to the upper compartment. This may be performed for two opposing side portions 502. The method 402 then comprises a block 413 of folding a second set of opposing upper sections over the stiffening members to form an upper surface of the build material container. The upper stiffening members are thereby arranged to distribute a load received on the upper surface to the side stiffening members, as described above.

The upper sections may comprise flaps of the two-dimensional net or blank. The upper stiffening members may accordingly comprise cuboid members formed from folding opposing flaps in a plurality of locations. An additional set of stiffening members may also be generated by folding the ends of the other two opposing flaps, i.e. those that form the upper surface. In this case, the flaps may be longer than half the width or length of the upper surface, i.e. half the width or length of the upper surface plus a height of the upper compartment. As such an edge of the additional set of stiffening members may contact the partition to transfer a load to the partition.

Figure 16:
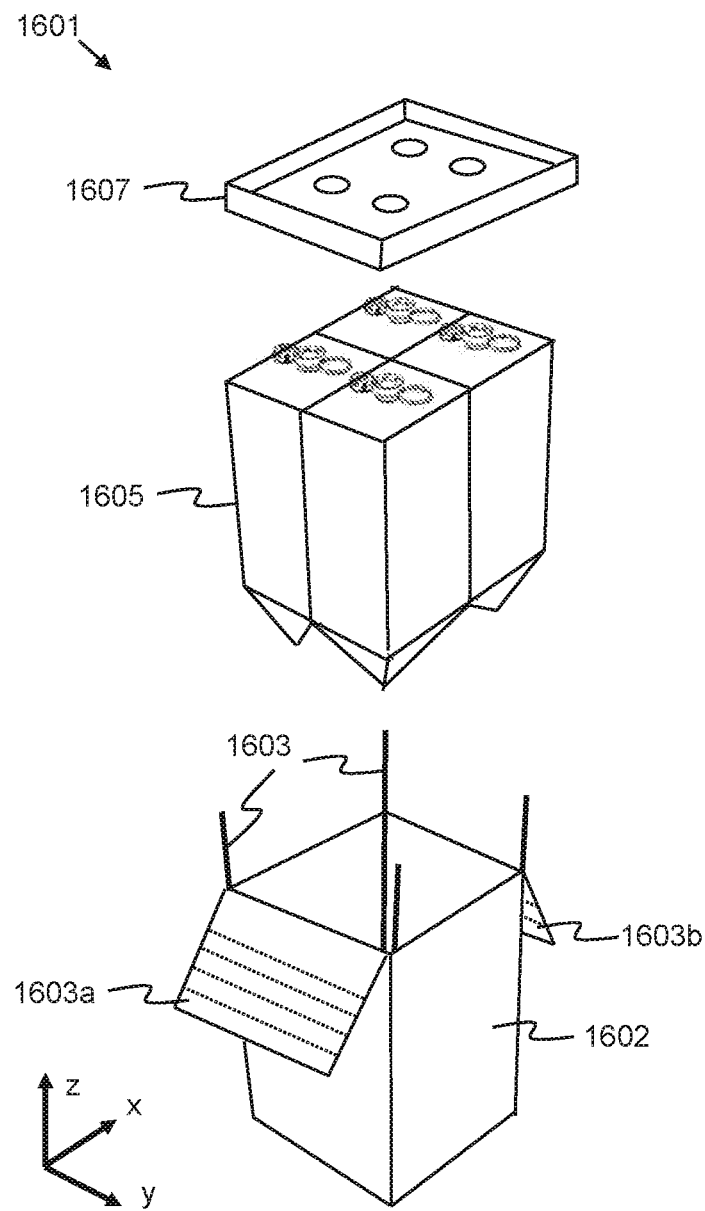
FIG. 16 is an isometric view showing how an example build material container may be constructed.

In some examples, the method 402 comprises mounting at least one polymer bag for holding build material within the side portions, wherein the load bearing members act as a guide to locate the polymer bag within the side portions. In other cases, the load bearing members may be inserted after the polymer bags, e.g. to further guide and support the bags within the interior of the external casing. In this example, the polymer bags may be mounted within a surround as described with reference to other examples. For example, this is shown in FIG. 16.

In some such examples, the method 402 comprises installing a planar partition between the polymer bag and the upper surface, the planar partition comprising at least one aperture to support at least one channel structure of the polymer bag.

Certain examples described with reference to FIGS. 3A to 3E, and FIGS. 4A and 4B, add a set of lead-bearing members within a build material container to strengthen the container, e.g. to support the stacking of containers. It enables bearing a load on an upper surface of the container in a manner than does not damage channel structures of the build material reservoirs, or compact the build material in the reservoirs. For example, a fully-loaded build material container in certain implementations may weigh up to 180 KG. A combination of vertical load bearing members may be used within the container together with horizontally-aligned upper stiffening members. The latter members distribute a load on an upper surface of the container around the channel structures of the build material reservoirs and through the load bearing members.

FIGS. 6A to 6I introduce a set of structures that may be used, individually or in combination with each other and/or with the related structures described above, to form a build material container. These structures help to protect channel structures of a build material container, e.g. during transport, and may be used to indicate use of build material within the container. The structures may be configured to facilitate access to build material reservoirs within the build material container while reducing or avoiding tearing or ripping of an external surface of the container.

Figure 6A:
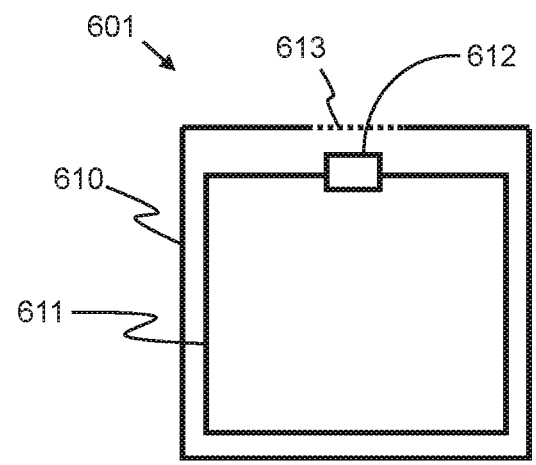
FIG. 6A is a schematic cross section showing an example build material container having a removal portion.

FIG. 6A shows schematically a build material container 601 for a three-dimensional printing system, according to an example. The container 601 comprises an external casing 610 having an outer surface. The external casing may for example be configured as described in relation to other examples.

The container 601 comprises an internal reservoir 611 for holding build material, the internal reservoir being positioned within the external casing. The internal reservoir 611 comprises an outlet structure 612 for coupling to an element of a three-dimensional printing system. In FIG. 6A, the outlet structure 612 is positioned below the outer surface of the casing 610, wherein the outer surface is an upper surface of the casing 610. In other examples, the outer surface may comprise a side surface and the outlet structures may be orientated to face this side surface.

The external casing 610 comprises a structurally weakened portion 613 arranged within an interior of the outer surface above the outlet structure. The structural weakening may, for example, be by way of perforations in the external casing, partial cutting of the external casing and/or thinning of the external casing. In examples, the structurally weakened portion 613 is pivotable about one side within the outer surface to remove the structurally weakened portion 613 from the external casing 610, such that the pivoting enables the user to remove the structurally weakened portion 613 for example by tearing perforations joining the portion 613 to the remainder of the external casing 610 (i.e. by tearing the side of the portion about which the portion pivots).

Responsive to a force applied to the structurally weakened portion 613, the structurally weakened portion 613 is separable to create an aperture in the outer surface, wherein the aperture enables access to the outlet structure 612. As such, the outlet structure 612 is covered until the structurally weakened portion 613 is separated. A consequence of this is that the outlet structure 612 can be protected from damage and environmental contamination during transport and storage, and exposed when ready for use.

Figure 6B:
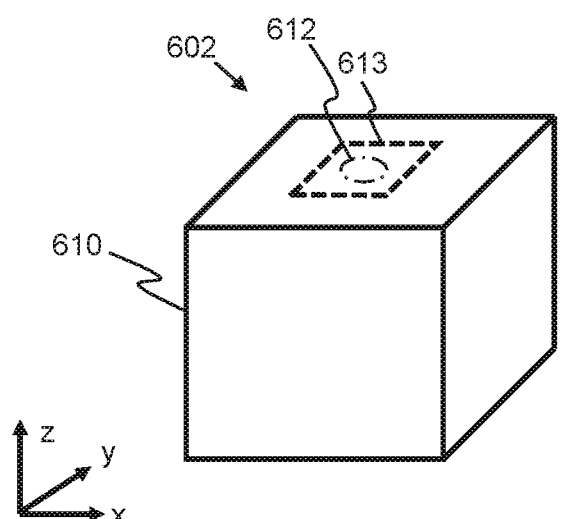
FIG. 6B is a schematic isometric drawing of the example build material container of FIG. 6A.

FIG. 6B shows a perspective view of a build material container 602, which is configured as described above in relation to FIG. 6A. The structurally weakened portion 613 is shown with a dashed line to indicate the weakening, and the outlet structure 612 is shown with a dash-dot line to indicate that it is covered by the structurally weakened portion 613.

The position of the structurally weakened portion 613, within an interior of the outer surface, is evident in FIG. 6B. This allows separation of the portion 613 without compromising the structural integrity of the top or side walls of the container 602, or causing them to buckle. This mitigates weakening of the container 602, in particular when stacked with similar containers in storage or transit. For example, when the structurally weakened portion is used together with the examples of FIGS. 3A to 3E, the structurally weakened portion may be arranged such that it does not overlap or interfere with the stiffening members 327 and/or 328. As such load is borne by the stiffening members underneath the upper surface rather than upon the structurally weakened portions. Although one structurally weakened portion is shown in FIGS. 6A and 6B, there may be a plurality of portions, e.g. when used in combination with the examples of FIGS. 15A, 15B and 16.

Figure 6C:
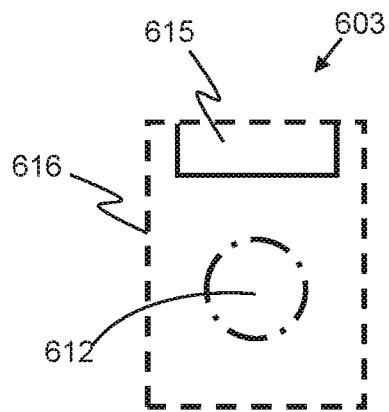
FIGS. 6C to 6I are schematic drawings of example structurally-weakened portions of an external casing.
Figure 6D:
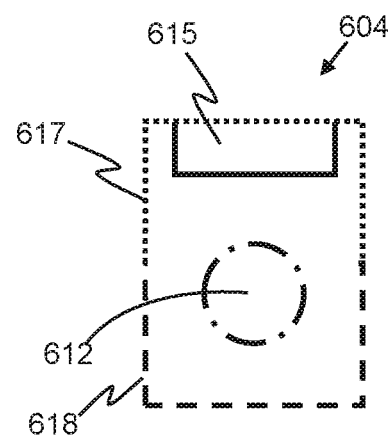
Figure 6E:
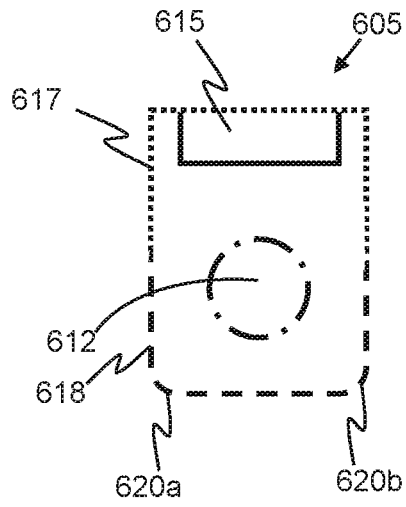

FIGS. 6C to 6E schematically show example structurally weakened portions 603-605. Each such portion 603-605 comprises an aperture 615 that is formed within the outer surface of the container to aid application of force to an underside of the respective structurally weakened portion. This aperture may have a variety of shapes, including being elongate as shown in the Figures. For example, the apertures may be configured such that a user may insert their fingers into the aperture and thereby pull on the underside of the structurally weakened portion, to separate it from the external casing of the container. In other examples the aperture may be omitted.

In certain examples, the aperture 615 forms at least part of one side of the structurally weakened portion and the structurally weakened portion further comprises at least three structurally weakened sides, wherein each structurally weakened side comprises cut portions interspersed with scored portions. For example, the weakening may be by way of perforations, whereby to assist the user in removing a given portion with ease and without tearing the surrounding portions of the external casing. In FIGS. 60 to 6E, dashed lines indicate perforations, and dash-dot lines indicate the position of the outlet structure 612 beneath the respective structurally weakened portions 603-605.

Referring to FIG. 6C, the perforations 616 of the portion 603 are evenly spaced around the perimeter of the portion 603.

In some examples, the cut portions of two lateral structurally weakened perforated sides of the structurally weakened perforated portion vary in at least one of length and spacing, such that an amount of force to separate the lateral structurally weakened perforated sides increases with distance from the elongate aperture. FIG. 6D shows schematically an example of such a portion 604. Near the aperture 615, the perforations 617 are closely spaced. This reduces the force required to tear this section such that the perforations may be torn by a user without difficulty.

Further from the aperture 615, the perforations 618 are widely spaced. The force to tear this section is high such that a user may typically have difficulty tearing this section alone, but the weakening of the container is correspondingly less. This may improve protection during storage and transport, e.g. prevent the structurally-weakened portion from being accidentally separated during storage and transport. As such, when removing the weakened portion 604, the user first tears the close perforations 617 with ease. The momentum generated in tearing this portion provides for easy tearing of the wide perforations 618. The user may thus tear the perforations 617, 618 with ease, whilst reducing the weakening of the container. Moreover, following separation of the perforations 617, it may be easier for a user to apply a larger force, as the structurally weakened portion may be pivoted about the side opposite the aperture 615. Although the perforations 617, 618 are shown as discrete sections for ease of explanation, it should be understood that in practice there may be a continuous or graduated change in a level and type of structural weakening along the sides.

FIG. 6E shows schematically a further example of a structurally weakened portion 605. The at least three structurally weakened sides of the structurally weakened portion 605 are joined by rounded corners 620a, b. The portion 605 further comprises closely spaced perforations 617 and widely spaced perforations 618. In some examples, in addition to comprising rounded corners 620a, b, the portion 605 comprises evenly spaced perforations, similarly as shown in FIG. 6C, as opposed to comprising differently-spaced perforations.

Figure 6F:
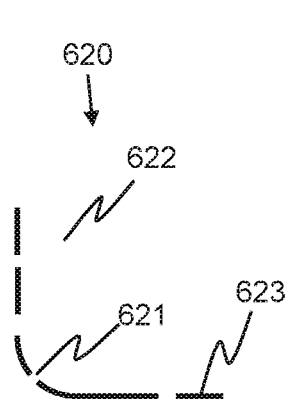

FIG. 6F shows schematically such a rounded corner 620. A central portion 621 of the rounded corner is uncut to enable a hinge effect when the force is applied. This hinge effect applies a torsion to the structurally weakened side between the rounded corners: as the part 622 of the portion 605 nearer to the elongate aperture 615 is pulled towards the user, the side 623 between the rounded corners is pushed away from the user. This torsion aids in tearing the side 623 between the rounded corners.

Figure 6G:
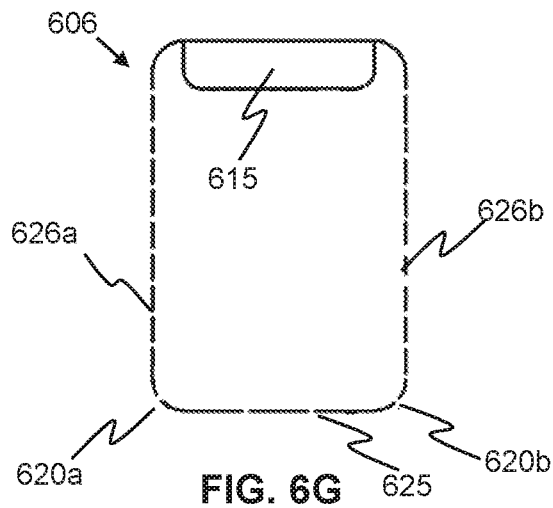

FIG. 6G shows schematically a further example of a structurally weakened portion 606. The dark lines represent cuts that are made in the external casing, whereas blank sections between the dark lines represent areas where the structurally weakened portion 606 is joined to the external casing. The portion 606 comprises an aperture 615 as described in more detail above. The structural weakening is by way of a microperforation system. A structurally weakened side 625 opposite the elongate aperture comprises longer cut portions than the two lateral structurally weakened sides 626a, b to prevent tearing of the external casing 610. For example, sides 626a, b may comprise a series of cuts having a first length, and side 625 may have a series of cuts having a second length, wherein the second length is greater than the first length. As the length of the cuts is longer on side 625 there are fewer sections of the portion 606 that are joined to the external casing 610. This reduces a likelihood of tearing as force is concentrated on the (shorter) joined sections. This aids the user in cleanly removing the portion 615 from the external casing 610 without causing damage. This feature may, as shown in FIG. 6G, be implemented in combination with rounded corners 620a, b as described in more detail above in relation to FIGS. 6E and 6F. Alternatively or additionally, this feature can be used in combination with varying perforation spacing, as described above in relation to FIG. 6D.

Figure 6H:
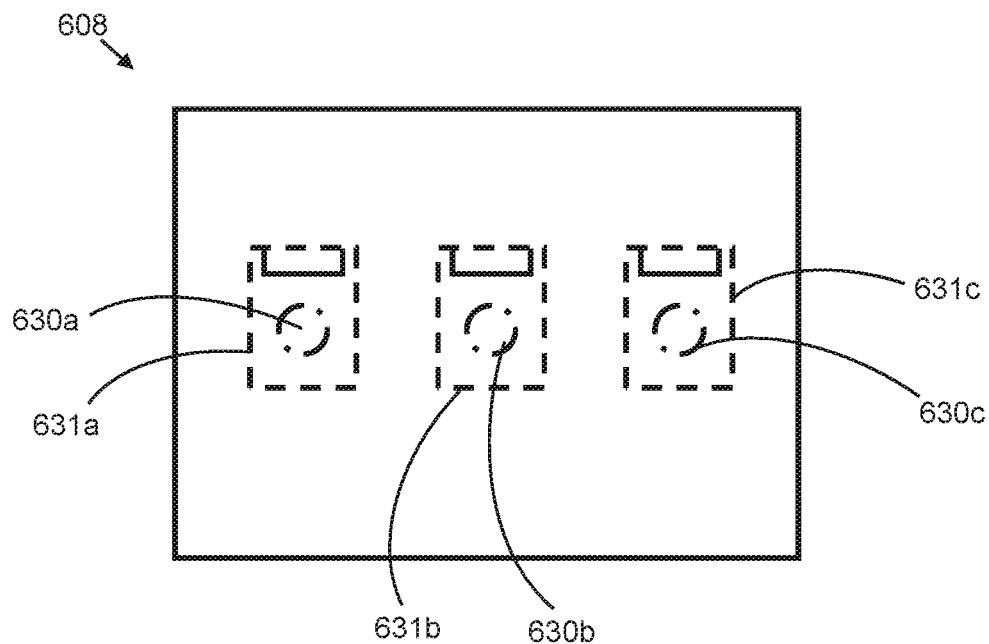

FIG. 6H shows schematically a top-down view of a build material container 608, according to examples of the present disclosure. The container 608 comprises a plurality of internal reservoirs each for holding build material, each internal reservoir having an outlet structure in the form of an outlet nozzle 630a-c (depicted with dash-dot lines to indicate their position beneath the external casing 610). The container 608 further comprises a plurality of structurally weakened portions 631a-c spaced within the external casing 610, aligned with each of the outlet nozzles 630a-c. In some examples, other configurations of structurally weakened portions 631 are used. For example, the container 608 may comprise four structurally weakened portions 631, in a two-by-two-grid layout. Alternatively, the structurally weakened portions 631 may be located in a side or a base of a build material container. In some examples, the container 508 comprises a partition within which the outlet nozzles are mounted, the partition separating the internal reservoirs from the outer surface of the external casing as described in more detail below in relation to FIGS. 9A to 9F.

Figure 6I:
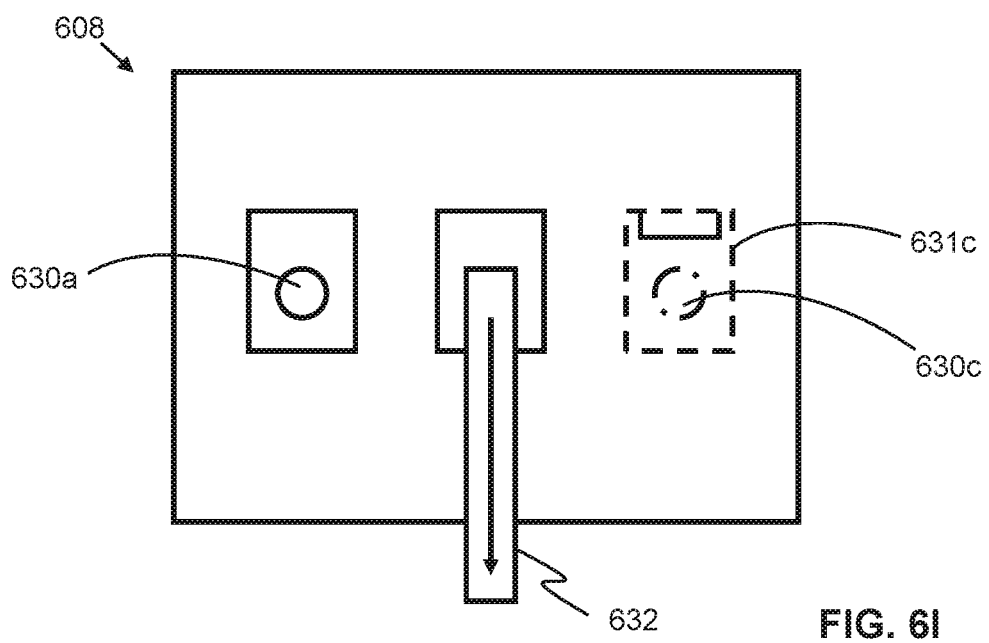

FIG. 6I shows schematically an example top-down in-use view of the build material container 608. The first structurally weakened portion 631a has been removed, with the nozzle 630a exposed underneath. The corresponding reservoir has been fully used, and the nozzle 630a disconnected from an element of the three-dimensional printing system. The absence of the first structurally weakened portion 631a provides a visible indication that this reservoir has been exhausted. The nozzle 630a may be self-sealing or otherwise sealable, to prevent exit of any residual build material in the reservoir.

In FIG. 6I, the second structurally weakened portion 631b has also been removed, and the nozzle 630b is connected to a supply apparatus 632, for example a hose, of an element of the three-dimensional printing system. The corresponding reservoir thus provides build material to the three-dimensional printing system.

In FIG. 6I, the third structurally weakened portion 631c has not been removed, and the corresponding nozzle 630c is concealed and thereby protected from damage and from environmental contamination. The presence of the third structurally weakened portion 631c also provides a visible indication that the corresponding reservoir is unused.

When the second reservoir is exhausted, the user may be alerted for example by a pop-up warning on a terminal associated with the three-dimensional printing system. The user can then remove the third structurally weakened portion 631c to expose the nozzle 630c of the third reservoir. Finally, the user can disconnect the supply apparatus 632 from the second nozzle 630b, and connect it to the third nozzle 630c. As noted above, the nozzles may be sealable, such that residual build material does not leak from the second nozzle 630b following disconnection. The third reservoir is thus configured to supply build material to the three-dimensional printing system. When the third reservoir is empty, the user can disconnect the third nozzle 630c, remove the container 608 and connect a first nozzle of a fresh container. In certain cases, more than one hose may be provided to allow multiple ones of the outlets of the build material reservoirs to be connected at any one time.

Figure 7:
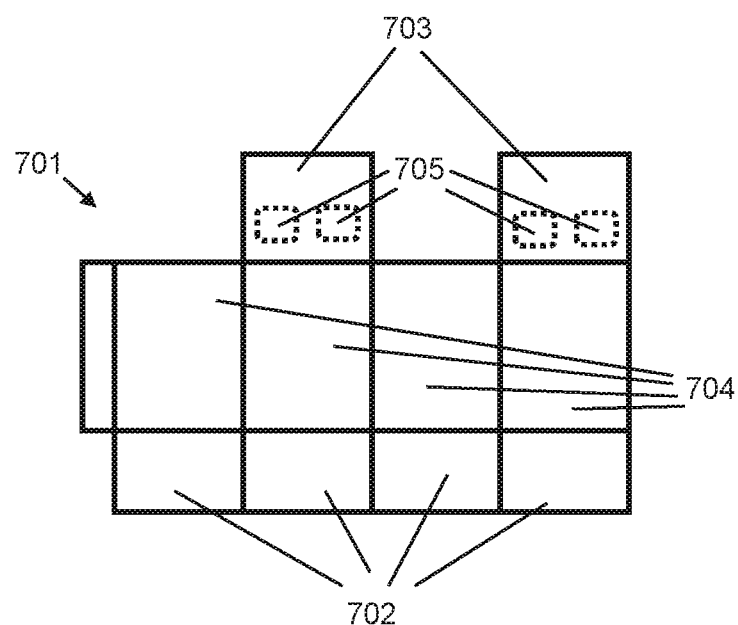
FIG. 7 is a schematic drawing showing an example blank or net for a build material container having removable portions.

FIG. 7 shows schematically a net or blank 701 to construct a build material container. The blank may comprise corrugated media. The blank 701 comprises sections 702-704 to form at least a base and sides of the build material container. The sections 702-704 comprise a plurality of structurally weakened portions 705, said portions 705 being at least partially separable from the build material container to access, when assembled, an interior of the build material container.

In some examples, the plurality of structurally weakened portions 703 are arranged in flaps 703 of the blank that form an upper surface of the build material container, as shown in FIG. 7. The flaps 703 may comprise two flaps 703 that are foldably coupled to respective side sections 704 of the blank. The flaps may be longer than half a length or width of the upper surface to accommodate stiffening portions as described with in the examples above.

In examples, the structurally weakened portions 705 comprise an aperture and a plurality of structurally weakened sides. As described in more detail above, the sides may be variably weakened to reduce tearing of the blank during removal.

Figure 8A:
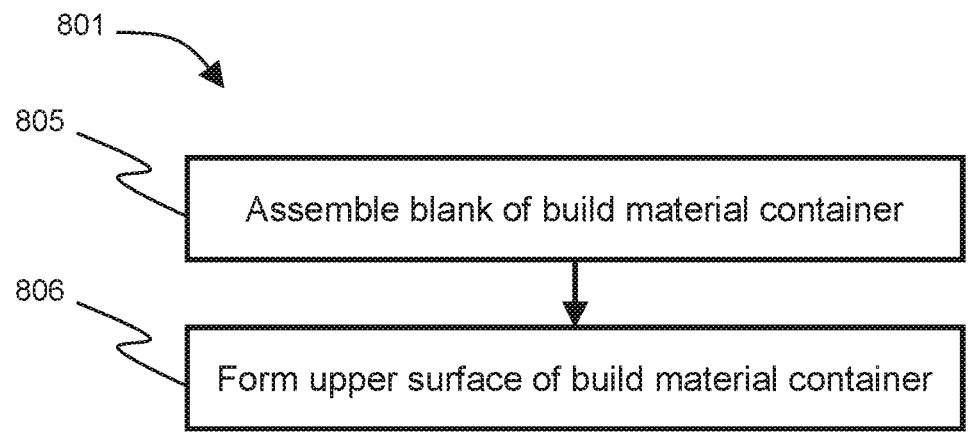
FIG. 8A is a flow diagram showing an example method for manufacturing a build material container.
Figure 8B:
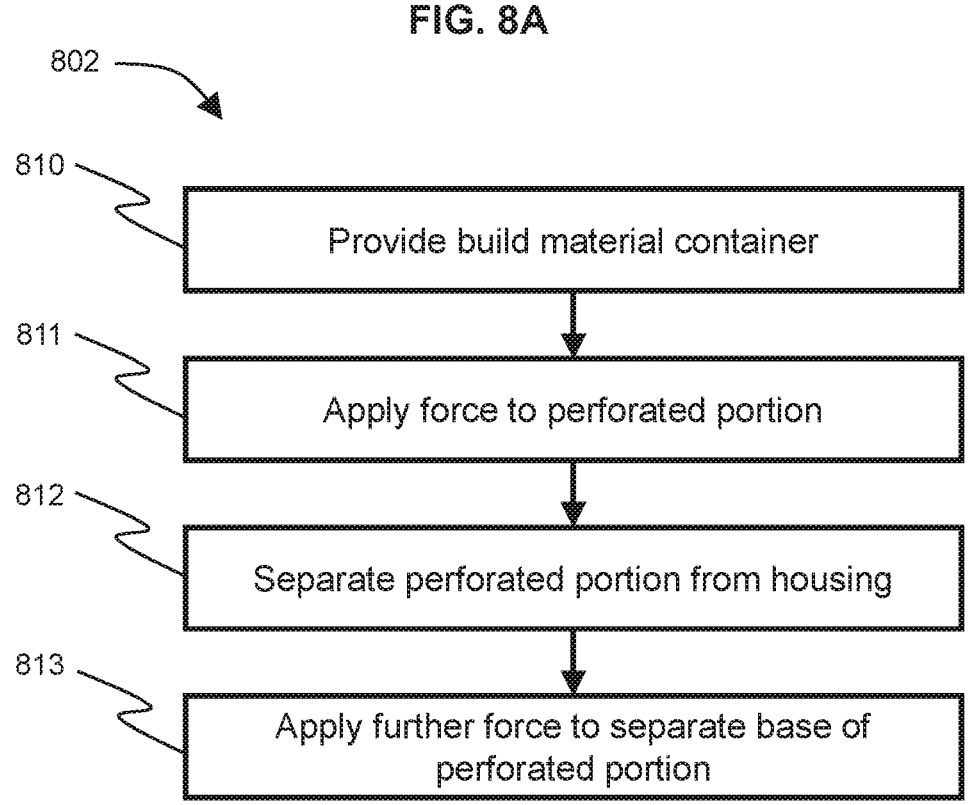
FIG. 8B is a flow diagram showing an example method for opening a build material container.

FIGS. 8A to 8B present methods 801-802 according to examples of the present disclosure.

FIG. 8A is a flow chart showing a method 801 of manufacturing a build material container for a three-dimensional printing system, the build material container being for example as described in more detail above.

The method comprises a block 805 of assembling a blank of the build material container, the blank comprising base and side portions. The blank is configured such that folding the side portions generates a three-dimensional form of the build material container. The build container may be formed from corrugated media.

The method then comprises a block 806 of forming an upper surface of the build material container, the upper surface comprising structurally-weakened portions in upper sections of at least two side portions. The structurally-weakened portions are aligned to generate apertures within the upper surface when at least three sides of the structurally-weakened portions are separated from the upper surface.

In some examples, the method comprises providing a support structure above the base and arranging multiple internal reservoirs within the support structure, each reservoir having an outlet structure for the extraction of build material. The method may then comprise arranging a partition above the multiple internal reservoirs, the partition comprising apertures for the outlet structure of said reservoirs, wherein separation of the perforated portions allows access to an upper compartment formed between the partition and the upper surface. The function of such a partition is described in more detail below in conjunction with FIGS. 9A to 9F.

FIG. 8B is a flow chart showing a method 802 of opening a build material container for a three-dimensional printer. The build material container may for example be configured as described in more detail above.

The method 802 first comprises a block 810 of providing a build material container comprising an internal reservoir within a housing. At block 811, the method 802 comprises applying a force to a structurally weakened portion of the build material container, e.g. which has been perforated or weakened by pre-cutting, by way of a first aperture in the housing. At block 812, the method 802 comprises separating the perforated portion from the housing along lateral perforations, including pivoting the perforated portion about a base of the perforated portion located opposite the first aperture. At block 813 a further force is applied to separate the base of the perforated portion from the housing. Removal of the perforated portion generates a second, larger aperture in the housing to allow access to an outlet structure of the internal reservoir.

The method 802 may comprise, for example after performing the above-described blocks, attaching a build material supply system to the outlet structure to enable transfer of build material within the internal reservoir to the three-dimensional printer. In some examples, the method 802 comprises, responsive to the internal reservoir being depleted, applying a force to a further perforated portion of the build material container to generate a further aperture in the housing. The method 802 may then comprise removing the further perforated portion to access a further outlet structure of a further internal reservoir of the build material container, and attaching the build material supply system to the further outlet structure to enable transfer of build material from within the further internal reservoir to the three-dimensional printer.

Certain examples described with reference to FIGS. 6A to 6I, FIG. 7 and FIGS. 8A and 8B, relate to enabling access to an internal reservoir of a build material container. Certain examples keep outlet structures of the build material container protected during transit. This is achieved using structurally weakened portions such as perforated windows in an upper surface of an external casing. Certain examples are directed to removing the portions in a manner that reduces tearing. For example, by using a particular perforation pattern and a hinging effect, which pivots the window about its base before the last side is removed, the portion may be easily removed with minimal tearing.

FIGS. 9A to 9F are schematic diagrams showing certain examples of a partition that may be used with a build material container. Although not shown for reasons of clarity, the examples of a build material container shown in these Figures may have any of the features of the other relevant Figures. The examples described with reference to these Figures may aid the protection of build material reservoirs and prevent build material accumulating within the container.

FIG. 9A shows a build material container 901 that comprises an external casing 910. This build material container 901 comprises an internal compartment 911 that is formed within the external casing 910. In FIG. 9A the internal compartment 911 contains a build material reservoir 920. In certain examples, the build material reservoir 920 comprises a deformable structure to store build material; in other examples, the reservoir 920 has a fixed structure. The reservoir 920 has a channel structure 913. The channel structure 913 may comprise one or more of an outlet structure and an inlet structure. These structures may respectively provide an outlet for build material to be supplied from the build material reservoir 920 and an inlet for the supply of at least one of build material or a gas such as air to the build material reservoir. In these cases, the channel structure 913 may comprise separate structures coupled to the reservoir 920 or a single, multi-function channel. FIG. 9A also shows a surround 925 that encloses the reservoir 920. This may comprise a box or other encasing polyhedron, or other shape, that supports and/or protects the reservoir 920. The surround 925 may also aid the assembly of the build material container 901 by facilitating the insertion of the build material reservoir 920. The surround 925 may comprise a corrugated media or polymer packaging.

The build material container 901 of FIG. 9A also comprises a partition 914 within which the channel structure 913 is mounted. For example, the partition 914 may comprise a planar structure that has an aperture to accommodate the channel structure 913. If there are multiple channel structures 913, the partition 914 may comprise multiple apertures. The partition 914 may be formed from the same material as the external casing 910, a similar material or a different material. The partition 914 may be recyclable. The partition 914 may comprise a sheet of corrugated media. The partition 914 is separate from the external casing 910 and the surround 925, e.g. may comprise an independent sheet or element that is not connected to the external casing 910 or the surround 925 before it is put in place. In one example, the partition 914 does not form a foldably coupled portion of a blank for the surround or the external casing. When positioned in place as shown in FIG. 9A, the partition 914 forms an upper surface of the internal compartment 911. As such the partition 914 restricts access to the internal compartment 911. Items that are dropped onto the partition 914 do not fall into the internal compartment 911. Similarly, build material that is spilled onto the partition 914 is collected rather than falling into the internal compartment 911. In one case, the aperture for mounting the channel structure 913 may provide a tight fit and/or the channel structure 913 may comprise a lip or flange that extends over the edge of the aperture. For example, the channel structure 913 may comprise an outlet structure that has a neck that has a smaller diameter than a head portion mounted above the neck. The head portion in this case may be couplable to a hose of a build material transport system, e.g. via mechanical and/or magnetic mechanisms.

As shown in FIG. 9B, the partition 914 may comprise a planar portion and a plurality of side portions 915 that project upwards. These side portions 915 form a raised edge or lip to the partition 914, such that it acts as a tray. The side portions 915 may project upwards towards a top of the external casing 910, having a height that is at least a proportion of the distance from the partition 914 to the top of the external casing 910. The top of the external casing 910 may be a top of the external casing 910 after an upper surface of the external casing 910 has been formed, e.g. by folding flaps of the casing over the partition 914. In FIG. 9B, the side portions 915 abut side walls 916 of the external casing 910. For example, this may comprise making contact with the side walls 916 so as to form a tight or snug fit against the side walls 916. When in place the partition 914 comprises a lower surface of an upper compartment 918 of the external casing 910, and an upper surface of internal or lower compartment 911. The partition 914 may be referred to as "cover reverse", as it provide a reverse or opposite surface to the upper outer surface.

FIG. 9C shows an example where the external casing 910 accommodates a plurality of build material reservoirs 912. Two build material reservoirs 912a, 912b are shown in the schematic cross-section of FIG. 9C, however, any number of build material reservoirs 912 may be accommodated, e.g. as described in more detail with reference to the later Figures. For example, in certain cases, four or six build material reservoirs may be mounted within the build material container 903. Although not shown for clarity, the build material reservoirs 912a, 912b may be as shown in FIG. 9A, or any of the other Figures such as FIGS. 1D to 1F. Additionally, each build material reservoir 912a, 912b may be mounted within a support structure, as for example shown in FIG. 1G to 1I. In FIG. 9C, the partition 914 has a plurality of apertures for the respective channel structures of the build material reservoirs 912. These may comprise apertures for an outlet and an inlet per build material reservoir 912. The partition 914 in this case may also comprise the side portions shown in FIG. 9B.

Figure 9D:
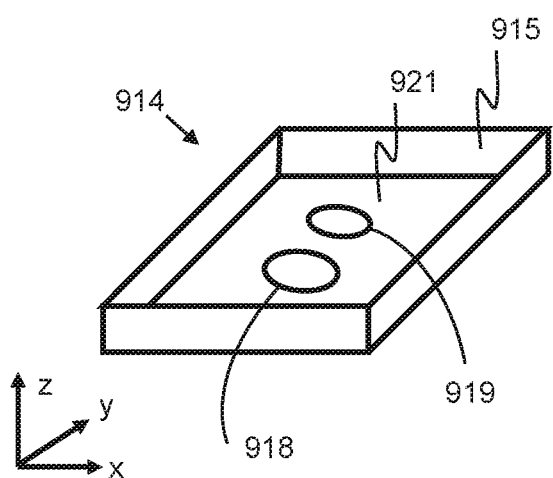
FIG. 9D is a schematic isometric drawing of an example partition.
Figure 9E:
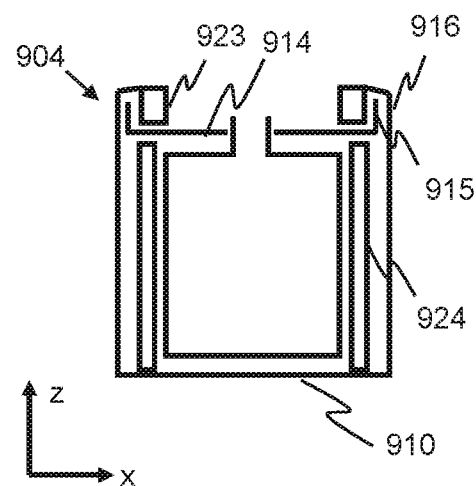
FIGS. 9E to 9F are schematic cross sections showing additional example build material containers with partitions.
Figure 9F:
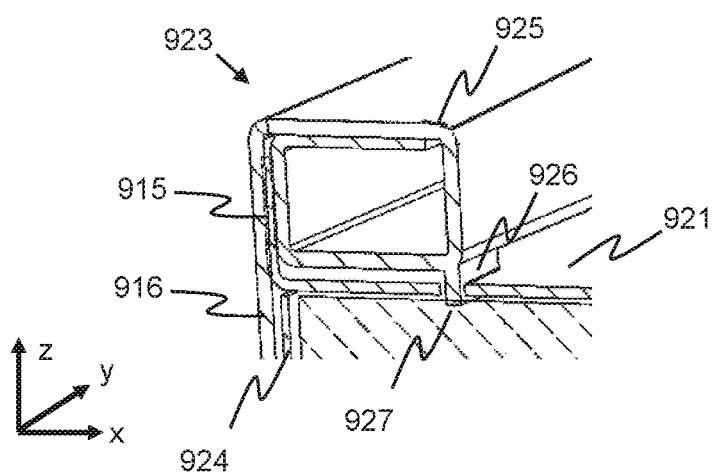

FIGS. 9D to 9F show schematically how an example partition 914 may be held in place within a build material container 904.

FIG. 9D shows a schematic isometric view of a partition 914 having a planar portion 914 and side portions 915, e.g. forming a tray-like independent structure that may be placed on top of the build material reservoir, e.g. including the surround, within an external casing 910. FIG. 9D also shows an example outlet aperture 918 and inlet aperture 919 for a case where one build material reservoir is provided that has both an outlet structure and an inlet structure.

FIG. 9E shows an example of the build material container 904 where the side portions 915 of the partition 914 are accommodated between side walls 916 of the external casing 910 and stiffening members 923 arranged above the partition 914. The stiffening members 923 in FIG. 9E are cuboid members that help to distribute a force applied to an upper surface (not shown) of the external casing 910 through the planar portion of the partition 914 to load bearing elements 924 that extend from the lower surface of the partition 914 to a base of the external casing 910. As described elsewhere, e.g. in relation to FIGS. 3A to 3F, stiffening members 923 and load bearing elements 924 may be implemented in a number of different ways while maintaining equivalent functional aspects. In the example of FIG. 9E, the stiffening members 923 are constructed from folding respective upper flaps of two sides of the external casing 910. For example, rather than folding the flaps to form part of an upper surface of the external casing (e.g. an upper or lower layer in such a surface), the flaps are folded in on themselves to create a cuboid member that extends along the length of each of the sides. This is shown in more detail in FIG. 9F.

FIG. 9F shows how an upper portion 925 or flap of the external casing 910 may be folded five times to create a cuboid stiffening member 923. A force applied to the upper horizontal surface of the cuboid stiffening member 923 is distributed through the vertical sides of the stiffening member 923 to the planar surface 921 of the partition 914. The force is then further distributed from the planar surface 921 to the load bearing elements 924. Although the stiffening members are shown as cuboid in the Figure, other prisms are possible, such as triangular prisms, by configuring the number of folds in the upper portion 925. As can be seen in FIG. 9F, the side portions 915 of the partition 914 are securely accommodated, e.g. wedged or pinched, between one vertical side of the cuboid stiffening member 923 and the side wall 916. This may act to hold the partition 914 in place and to prevent access to the internal compartment 911. It also stops build material and other objects that collect on the partition 914 from entering the internal compartment 911.

FIG. 9F also shows how the partition 914 may be used to help secure the stiffening members 923. In the example of FIG. 9F, the planar portion 921 of the partition 914 comprises a number of slots 927 (e.g. elongate apertures aligned along a length of the stiffening member). These slots 927 receive tabs located on the stiffening members 926 to secure the stiffening members 926 into place and to prevent said members from unfolding. There may be multiple slot and tab pairs along the respective length of the planar portion 921 and the stiffening member 923. In use, and as shown in later Figures, the other two sides of the external casing 910 may be folded over the two stiffening members 923 to form an upper surface of the build material container. In other examples, alternate methods of securing the stiffening members, such as tape or additional members may be used.

Figure 10A:
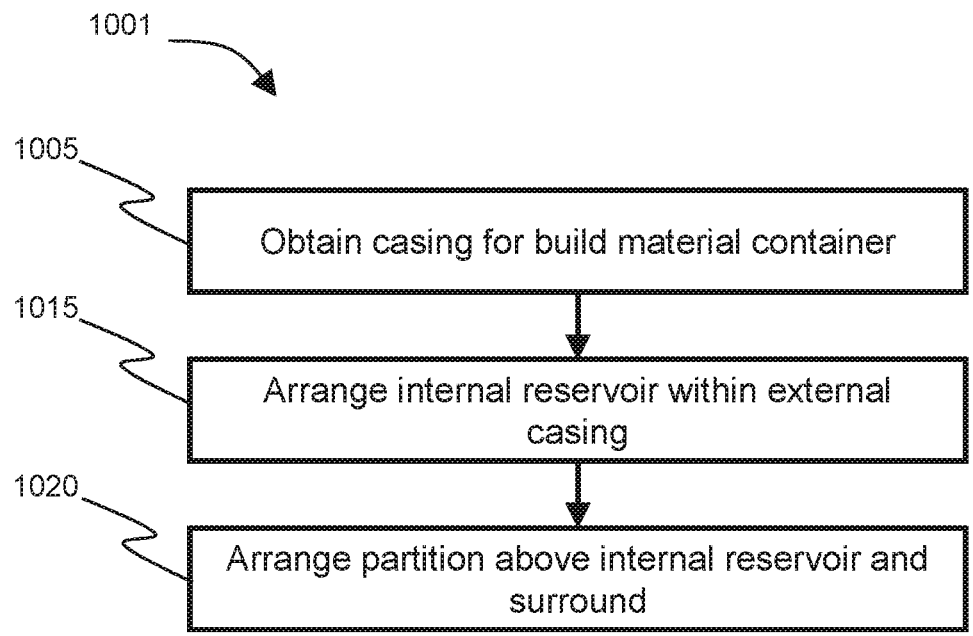
FIG. 10A is a flow diagram showing an example method for assembling a build material container.
Figure 10B:
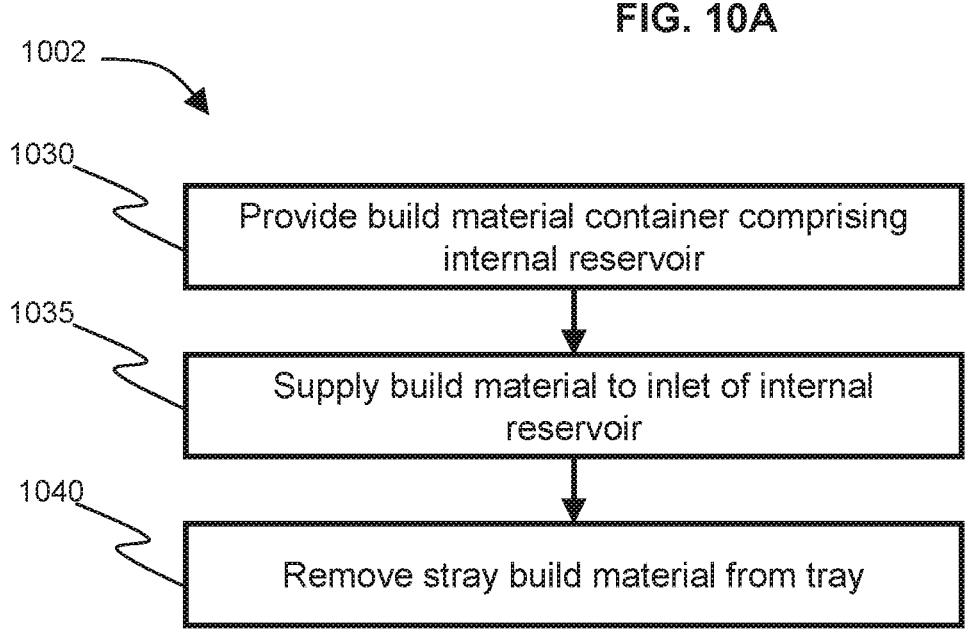
FIG. 10B is a flow diagram showing an example method for filling a build material container.

FIGS. 10A and 10B are flow diagrams that show methods 1001, 1002 that may be applied in association with the partition described in FIGS. 9A to 9F.

FIG. 10A shows a method 1001 of assembling a build material container for a three-dimensional printing system. The build material container may be the container 901-904 of FIGS. 9A to 9F or a build material container of a different implementation. The method may be similar, and use blocks from other methods of assembly, construction, or manufacture discussed herein.

In FIG. 10A, the method comprises a first block 1005 of obtaining an external casing for the build material container. In one case, the external casing is obtained by assembling a blank, wherein a blank is a foldable two-dimensional net or template that is used to construct a build material container. The blank may comprise an unfolded, corrugated box or connectable portions of a polymer container. The external casing comprises base and side portions. The base may comprise flaps that are foldably coupled to each side portion, wherein the flaps are foldable, e.g. over each other, to generate a base of the external casing. In other cases, the base may comprise a planar surface foldably coupled to one of the side portions that may be joined to the other side portions. Obtaining an external casing may comprise folding and securing, e.g. with tape or glue, a three-dimensional form of the build material container. In certain cases, block 1005 may comprise receiving a pre-folded or pre-assembled build material container, such as a pre-formed box or the like.

FIG. 10A then comprises a block 1015 of arranging an internal reservoir within the external casing. The internal reservoir stores build material and may comprise one of the build material reservoirs described herein, e.g. a reservoir in the form of a box or polymer bag. In the present case, the internal reservoir comprises a channel structure, such as an outlet and/or inlet structure, and a surround. The internal reservoir may comprise a deformable structure that is affixed or affixable to another blank. This other blank may then be folded to generate the surround with the deformable structure inside. The surround may be glued or taped to form a three-dimensional polyhedral structure. Arranging the internal reservoir within the external casing, i.e. the assembled build material container from 1005, may comprise slotting and/or sliding the surround into the assembled build material container from an open top of the container. The build material container may comprise one or more guide members to facilitate insertion of the surround. These guide members may comprise the aforementioned load bearing elements. In another case, the build material container may be assembled around the surround, e.g. where the surround is mounted on a base of the external casing or a support structure and the side portions of the blank are assembled around it.

Lastly, FIG. 10A comprises a block 1020 of arranging a partition above the internal reservoir and the surround. This may be the partition 914 described with reference to FIGS. 9A to 9F or a different form of partition. The partition in the present case comprises an aperture to receive the channel structure of the reservoir. The partition may be planar or have another structure so as to collect material deposited thereupon. Block 1020 may comprise slotting the aperture over a respective channel structure formed at a top of the build material reservoir. Following block 1020, the partition forms a lower surface of an upper compartment of the build material container, wherein the build material reservoir is held within a lower compartment of the build material container. Following arrangement, the partition restricts access to a volume of the external casing below the partition. The partition is arranged to collect build material during use of the channel structure. For example, the partition may collect build material that is spilt during either supply or filling.

In certain examples, the method 1001 may additional comprise the block of supplying build material to the internal reservoir via the channel structure. For example, this may comprise attaching a filling system to an inlet structure of the build material reservoir such that build material may be supplied to the interior of the reservoir (i.e. fill the reservoir). The filling system may comprise a hose that is coupled to the inlet structure. Filling may comprise supplying a predetermined weight or volume of build material to the build material reservoir. Filling may also comprise compacting the build material in the build material reservoir and/or applying a pressure during supply of the build material, e.g. so as to accommodate the predetermined weight or volume of build material intended to be stored therein. Following filling of the build material container, any spilt build material may be removed as described below. The channel structure may also be sealed, e.g. using a heat sealer, and/or fitted with tamper-evident mechanisms. Upper sections of the side portions of the external casing may then be folded over the channel structure of the internal reservoir to form a protective upper surface of the build material container. This may comprise folding and sealing upper flaps of a box forming the external casing. The external casing may then be wrapped or otherwise protected for transport to a location of a three-dimensional printing system.

In one example, arranging an internal reservoir comprises arranging a plurality of internal reservoirs within a support structure, and arranging a planar partition comprises aligning apertures within the partition with inlets of the plurality of internal reservoirs. For example, the support structure may be similar to that shown in FIG. 1H (amongst other Figures). The plurality of internal reservoirs may comprise a plurality of container cells as described in more detail later below. For example, the plurality of reservoirs may comprise two rows of internal reservoirs, where each row has two columns, such that four internal reservoirs are provided. Each internal reservoir may have a corresponding surround. The partition may therefore be supported on each surround and/or any load bearing elements. In one case, the channel structure for each internal reservoir comprises an inlet and outlet structure. In this case, where four internal reservoirs are provided, block 1020 may comprise slotting eight channel structures through a planar portion of the partition.

As demonstrated in FIGS. 9E and 9F, the method 1001 may comprise folding upper sections of side portions of the external casing. In one case, this may further comprise folding a first set of opposing upper sections to generate upper stiffening members that extend along opposing sides of the build material container. This may comprise folding flaps of a blank as shown in FIG. 9F. In this case, flanges of the partition, e.g. sides 915 in FIG. 9D, may be secured between the side portions and the stiffening members. This may occur as the stiffening members are folded over the partition. Once stiffening members have been formed, a second set of opposing upper sections may be folded over the stiffening members to form the upper surface of the build material container. For example, this may comprise folding neighboring flaps of the external casing. These neighboring flaps may have themselves a folded portion that contacts the surface of the partition to distribute a force applied to a center of the upper surface to the partition. As shown in FIG. 9F, folding a first set of opposing upper sections may comprise securing tabs located on the upper stiffening members within respective slots upon the planar partition. For example, a partition may comprise a set of three slots aligned along a length of one side of the external casing.

FIG. 10B shows a method 1002 of filling a build material container for a three-dimensional printing system. The method comprises a first block 1030 of providing a build material container comprising an internal reservoir. This may comprise performing the method 1001, or supplying a differently formed build material container, e.g. such as any of the variations described herein. Block 1035 then comprises supplying build material to an inlet of the internal reservoir to fill the build material container. This may comprise attaching a hose or filling tube to a threaded aperture forming the inlet that is provided within the internal reservoir, e.g. which is formed within, or affixed to, an upper surface of the internal reservoir. This filling block may comprise the filling procedure discussed above. It may continue until a predetermined quantity of build material has been supplied, e.g. by weight and/or volume. During block 1035 build material may be spilt on the build material container. For example, this may occur when fitting and/or removing a supply hose or tube for the build material. Additionally, if multiple reservoirs are used, a last reservoir may be more difficult to fill than a first reservoir, due to a restricted volume within an internal compartment of the external casing (e.g. other bags may be full of material). For example, the presence of build material in a given full reservoir may exert an outward pressure that is applied to side walls of that reservoir, causing deformation outwards as described above in relation to FIG. 1E and thereby restricting the available volume within the internal compartment of the external casing. Hence, build material may need to be supplied under pressure, which may lead to build material being spilt when a supply hose or tube is removed. Similarly, residue from a previous fill operation may be present in a supply hose or tube, or upon or within other components, which may spill or otherwise come to be deposited on the build material container. In these cases, a tray (e.g. the previously described partition) of the build material container collects this stray and/or spilt build material and prevents it falling into the internal compartment containing the build material reservoirs. As such at block 1040, build material within the tray located above the internal reservoir may be removed, e.g. by applying a vacuum system or via a manual collection. In this case, the tray comprises flanges that abut side walls of the build material container to prevent stray build material from entering the internal compartment, e.g. an interior, of the build material container. Without the tray build material may fall within the interior of the build material container. In this latter comparative case, i.e. without the tray, a build material container may need to be dissembled to clean the container of stray build material container prior to transport. By supplying the tray (or partition), build material can be easily and safely removed.

In one case, following the removal of stray build material, the build material container is closed to form an outer protective surface. This may protect the build material container during transport, e.g. protect the build material, channel structures and associated support structures. In one case, supplying build material to an inlet of the internal reservoir comprises supplying build material to multiple internal reservoirs within the build material container.

The examples shown in FIGS. 9A to 9F and 10A and 10B provide a safety component that may be used during filing and/or extraction of build material. It may be used to prevent dust or residue accumulating within an interior of the build material container, where it may be difficult to clean and/or remove. This may also be useful to control overflow of build material. It may also be useful when emptying and/or dissembling the build material container, e.g. for recycling. It may also avoid disassembly of the build material container when objects are dropped into the container. It may also prevent entry or intrusion of foreign elements, e.g. those that could puncture a deformable reservoir or otherwise contaminate build material over time. A partition or tray as described may also be used in conjunction with load bearing or stiffening members to distribute structural loads during filling, transport, and/or supply of build material. For example, structural loads may be distributed to allow build material containers to be stacked on top of each other. The examples also aid assembly of a build material container, especially those comprising multiple build material reservoirs. The examples provide a receptacle for spilt build material which does not form a slope or otherwise allow entry into the interior of the container.

FIGS. 11A to 11J and FIG. 12 shows examples of an inlet structure for a build material reservoir, such as a deformable structure or chamber, and a method of supplying build material from a build material reservoir. These examples may increase the efficiency and continuity of the supply of build material. For example, in certain cases, they may avoid structures such as "rat-holes" forming in the build material resident within the build material reservoir by selectively controlling the ingress of gas such as air into the reservoir.

FIG. 11A schematically shows a gas inlet structure 1101 according to an example. The gas inlet structure 1101 may be used with a deformable build material reservoir to facilitate the supply of build material from the build material reservoir. The gas inlet structure 1101 may be used as a channel structure as described in other examples. The gas inlet structure may be used to allow a gas, such as air or an inert gas, into a deformable structure or chamber of the build material reservoir, e.g. to temporarily increase a pressure within the structure or chamber. The gas inlet structure may be closed, e.g. to temporarily lower a pressure within the structure or chamber when a vacuum is applied, for example by way of an aspiration tube as set out above.

The gas inlet structure 1101 of FIG. 11A first comprises a coupling mechanism 1110 to attach the gas inlet structure to a deformable build material reservoir. In FIG. 11A, the coupling mechanism 1110 comprises a series of threads that may be used to couple the gas inlet structure 1101 to a corresponding set of threads on the deformable build material reservoir. For example, if the deformable build material reservoir comprises a polymer bag, the corresponding set of threads may comprise a corresponding coupling mechanism that is heat sealed to an aperture in said bag, wherein the gas inlet structure 1101 may be screwed into place upon the bag. In other examples, the coupling mechanism 1110 may comprise a different structure, e.g. using a different mechanical coupling such as interlocking members, using a magnetic coupling, or using a permanent attachment such as a heat seal.

The gas inlet structure 1101 has an upper aperture 1111 to allow gas to enter the inlet structure and a lower aperture 1112 to allow gas to enter the deformable build material reservoir. In examples, the orientation of these apertures may differ, e.g. the gas inlet structure 1101 may be rotated and attached to a side or base of a deformable build material reservoir.

In FIG. 11A, a passive valve 1113 is located within the gas inlet structure 1101 to selectively allow a gas to enter the deformable build material reservoir. The passive valve 1113 is configured to operate at a predetermined back pressure. For example, in FIG. 11A, the passive valve 1113 may be configured to open and allow gas to flow from the upper aperture 1111 to the lower aperture 1112, i.e. into the deformable build material structure, when a predetermined pressure differential exists across the passive valve 1113, e.g. when a pressure below the valve in the Figure is less than a pressure above the valve in the Figure, e.g. differs by at least a predefined amount. This corresponds to a pressure differential between a pressure inside the deformable build material reservoir and a pressure outside the deformable build material reservoir, e.g. within an internal compartment of an external casing of a build material container.

In one implementation, the passive valve comprises an umbrella valve to selectively allow gas such as air to enter the deformable build material reservoir. This type of valve comprises a diaphragm that moves under a force applied by a pressure differential. The diaphragm is mounted in its center and as such resembles an umbrella. In other implementations an alternative valve mechanism may be used, such as a ball or butterfly valve. Operation of an example umbrella valve is described later with reference to FIGS. 11H to 11J.

FIGS. 11B and 11C are schematic diagrams showing an example build material reservoir 1102 that has an inlet 1123. This inlet may be implemented by the gas inlet structure 1101 or another inlet structure. FIGS. 11B and 11C demonstrate how structures such as "rat-holes" may form in a build material reservoir. The build material reservoir 1102 may be a version of one of the build material reservoirs shown in FIGS. 1D to 1F. The build material reservoir 1102 is configured to store build material, e.g. build material as described above, for a three-dimensional printing system.

In FIG. 11B the build material reservoir 1102 has an inlet 1123 that allows a gas such as air into the reservoir (as indicated by the arrow in the Figure). The build material reservoir 1102 also comprises an outlet 1122 to allow build material to be supplied from the reservoir to an element of a three-dimensional printing system. For example, build material may be extracted by applying a vacuum to the outlet 1122. The vacuum may be applied by an aspiration system of the three-dimensional printing system, such as build material transport system 215 in FIG. 2A or 2B. The outlet 1122 in FIG. 11B comprises an aspiration channel such that build material is extracted via an opening at the base of the aspiration channel at the bottom of the build material reservoir 1102. The extraction of build material is represented by an arrow within the outlet 1122 in the Figure. Although FIGS. 11B and 11C show an aspiration channel, other configurations may omit these features, e.g. those with an outlet at the base of the build material reservoir.

FIG. 11O shows a structure 1125 forming in build material 1126 during the application of a vacuum, e.g. by an aspiration system. In this case, the structure 1125 comprises a tunnel that has formed within the build material 1126 as build material is extracted under a vacuum. The tunnel is known in the art as a "rat-hole" as it may resemble a tunnel made by a small rodent. The presence of such a tunnel can prevent build material from entering the outlet 1122 and thereby cause a failure of a printing operation, or of a filling operation of a powder management system or build unit of a three dimensional printing system. Once the tunnel forms the aspiration system begins to extract gas 1127 such as air in an upper part of the build material reservoir 1102 as well as, or instead of, build material 1126 from the reservoir. Although the tunnel is shown as a single structure, in practice it may form from a number of microstructures that allow a flow of gas from the upper part of the build material reservoir 1102 to the outlet 1122.

In a comparative case, a gas inlet without a valve as configured in the present examples, allows gas into the build material reservoir 1102 in FIG. 11O. As such the supply of build material stalls or stops as even though the aspiration system is applying a vacuum, gas rather than build material is extracted from the build material reservoir 1102.

Figure 11D:
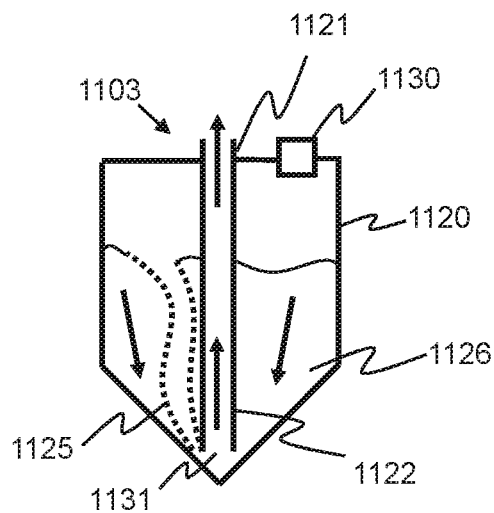

Certain examples herein, including the gas inlet structure 1101 as shown in FIG. 11A, address the issue of structures forming in the build material and the supply of build material stalling or stopping by generating a series of pressure cycles within the build material reservoir 1102. When the build material reservoir 1102 comprises a deformable structure, these pressure cycles lead to a cyclical deformation in the structure, which help collapse macro and micro fluid channels or structures, such as rat holes within the build material. This is explained in more detail with reference to FIGS. 11D to 11G below.

FIGS. 11D to 11G show four states 1103 to 1106 of a deformable structure 1120 for storing build material for a three-dimensional printing system. The deformable structure 1120 may implement a build material reservoir. As shown in these Figures, the deformable structure 1120 comprises an outlet 1121 and an inlet 1130. The outlet is connectable to an aspiration system of an element of the three-dimensional printing system, to allow build material to be supplied from the deformable structure 1120 on application of a vacuum by the aspiration system. The inlet comprises an actuatable valve to selectively allow gas to flow into the deformable structure 1120. The actuable valve may comprise a passive valve, such as that shown in FIG. 11A, which is configured to open at a predefined back pressure, i.e. a predefined pressure differential. Alternatively, the actuable valve may comprise an active valve configured to open on supply of an electronic control signal. In examples wherein the valve is an active valve, the build material supply comprises circuitry for opening and closing the valve, as well as a power supply for the circuitry. The valve is actuatable as in it may be selectively controlled or actuated using either active or passive components.

In FIGS. 11D to 11G, the outlet 1121 forms an upper part of an aspiration channel 1122 that extends along a length of the deformable structure 1120. As described previously, the aspiration channel 1122 may comprise a pipe or tube that extends within the interior of the deformable structure 1120 to enable build material to be efficiently extracted. The aspiration channel 1122 has an opening 1131 at a base of the deformable structure. In FIG. 11D, the base of the deformable structure 1120 is polyhedral in order to maximize build material extraction. Although, FIG. 11D shows a polyhedral base and an aspiration channel, other configurations may omit these features, e.g. those with an outlet at the base of the build material reservoir, while still applying an inlet as described in the present examples.

As shown by the arrows in FIG. 11D, during application of a vacuum to the outlet 1121, build material is transported from the deformable structure 1120. In the example of FIG. 11D this is through the opening 1131 and up the aspiration channel 1122, to the outlet 1121. The term "vacuum" as used herein means a pressure that is substantially lower than a normal pressure within the deformable structure and build material container that allows build material to be extracted via the outlet 1121. A vacuum may be applied by a build material transport system such as 215 in FIGS. 2A and 2B. In practice, a mixture of build material and the gas within the deformable structure 1120 may be extracted, wherein in normal operation this mixture is mainly build material.

During normal operation, as shown in FIG. 11D, the inlet 1130 is initially closed. While build material is being successfully extracted, a pressure within the deformable structure, e.g. in an empty portion of the deformable structure 1120, slowly decreases as a volume of build material is removed from the structure. The pressure within the empty portion is above a predefined pressure threshold for operation of the actuatable valve within the inlet 1130. The empty portion comprises an upper portion of the deformable structure 1120 shown in FIG. 11D. The portion is "empty" as in it does not contain build material; however, it may contain a gas such as air or an inert gas.

Figure 11E:
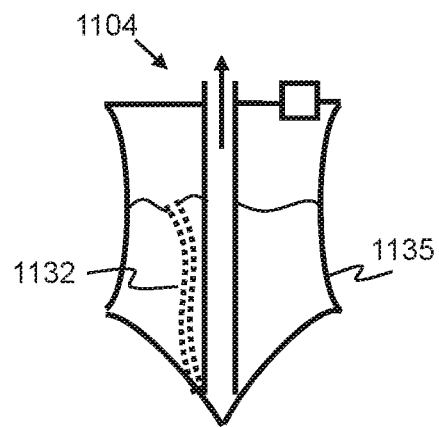

If a structure 1125 forms in the build material 1126 that fluidically couples the empty portion to the aspiration system applying the vacuum then the pressure in the upper empty portion may rapidly decrease as gas is removed from the empty portion. As shown in FIG. 11E this reduction in pressure in the empty portion leads to a deformation of the deformable structure 1120. In particular, sides 1135 of the deformable structure 1120 may deform inwards. For example, if the deformable structure 1120 comprises a polymer bag, then sides of the bag may be sucked inward.

In certain examples, the deformable structure 1120 may be attached to a supporting surround, e.g. as described with reference to previous examples. In this case, the deformable structure 1120 may deform within the constraints imposed by attachments to the supporting surround, e.g. the structure may still be retained in places to the supporting surround but may deform inwards in sections between these places. In other cases, a surround may be omitted.

Figure 11F:
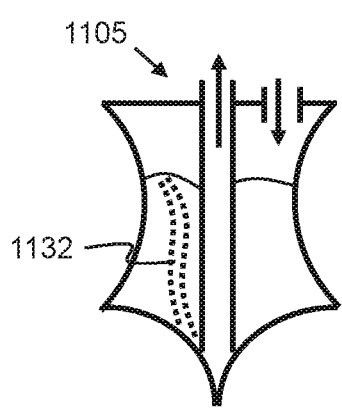

As shown in FIG. 11E, a reduction in pressure in the deformable structure 1120 deforms at least a portion of the sides of the structure and compresses the build material within. In some examples, the entirety of the sides of the structure 1120 are deformed, as shown in FIGS. 11E and 11F. In other examples, portions of the sides of the structure 1120 are deformed. For example, the structure 1120 may deform in empty regions of the structure but not in regions below the level of build material in the structure 1120. The degree of deformation may depend on the fill level of the structure 1120. This also leads to compression of build material surrounding the structure 1125. The structure 1125 is thus also compressed as shown by 1132 in FIG. 11E.

Figure 11G:
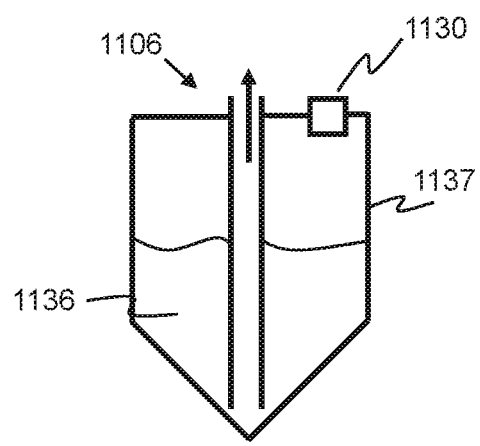

FIG. 11F shows that as the pressure reduces further in the deformable structure a predefined threshold pressure is reached. For example, this may comprise a predefined pressure differential across the inlet 1130 or a measured pressure, either within the deformable structure 1120 itself or via the aspiration system that is coupled to the outlet 1121. In FIG. 11F, at the predefined threshold pressure, the valve in the inlet is opened as shown by the arrow. The valve may be opened actively by supplying an electronic control signal to actuate the valve or passively by a component such as a membrane within the valve changing shape and/or size to allow gas to flow into the empty portion of the deformable structure 1120. As shown in FIG. 11G, allowing gas flow into the deformable structure 1120 deforms the sides 1137 of the structure outwards, i.e. back towards a default or relaxed state. This then decompresses the build material within the deformable structure. The cycle of compression and decompression collapses the original structure 1125, as shown by 1136 in FIG. 11G. As gas flows into the deformable structure 1120, the pressure increases and the valve once again closes, either passively or through deactivating the electronic control signal. Build material can this continue to be successfully extracted.

The sequence shown in FIGS. 11D to 11F provides a "bellows" effect on at least portions of the deformable structure that collapses macro and micro structures that form in build material within a build material reservoir. The changes in pressure enabled by the actuatable valve in the inlet 1130 in the deformable structure radially compress and crush these structures. As build material is removed from the deformable structure, the pressure inside the structure decreases (i.e. a vacuum within the structure increases). The pressure decrease is enabled by the closing of the valve. When the valve is opened the pressure inside the structure increases (i.e. the vacuum within the structure decreases). Expansion of the deformable structure enables the macro and micro structures within the build material to collapse into the bottom of the deformable structure. This cycle may be repeated multiple times during supply of build material. When a passive valve is used, the cycle is initiated automatically during supply. When supply of build material is complete, the aspiration system may be switched off such that a vacuum is no longer applied to the outlet 1121. In this case, gas may flow into the bag via the outlet 1121 to reinflate to a default or relaxed state. This default or relaxed state may be configured based on a shape and/or size of any supplied surround. In certain examples, the deformable structure may have an elasticity such that stretching of at least one side wall during deformation inwards is opposed by a tendency of the structure to return to a relaxed state. This may operate in combination with attachment to the surround, e.g. such that deformation and stretching occurs between the attachment points.

Figure 11H:
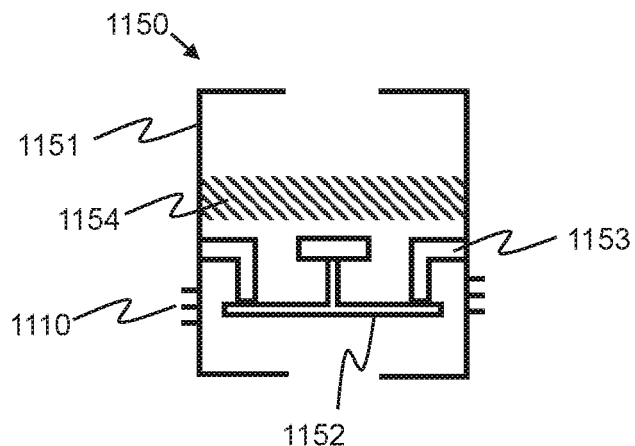
FIGS. 11H to 11J are further schematic cross sections of example gas inlet structures.
Figure 11I:
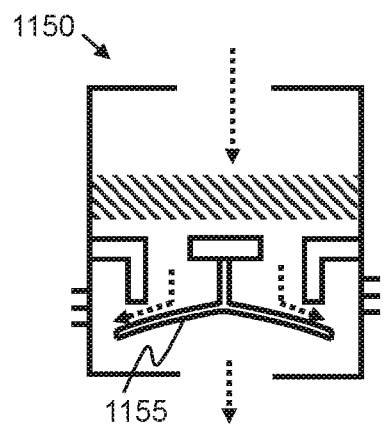
Figure 11J:
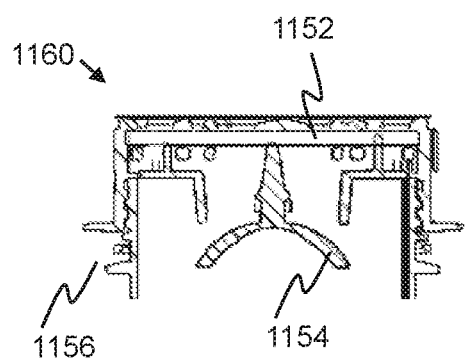

FIGS. 11H to 11J show how an example passive valve within a gas inlet structure 1150, 1160 may be actuated during the cycle shown in FIGS. 11D to 11G. For example, this may comprise a version of the valve installed within a gas inlet structure such as 1101 in FIG. 11A. FIGS. 11H and 11I are schematic cross-sections, while FIG. 11J is a cross-section of an example inlet structure.

The gas inlet structure 1150 of FIGS. 11H and 11I comprises a casing 1151, wherein a coupling mechanism 1110 is configured to couple the inlet structure 1150 to a build material reservoir. The coupling mechanism may for example be in the form of a series of threads formed within, i.e. on the exterior of, the casing, or another form of mechanical coupling. Alternatively or additionally, the inlet structure 1150 may be coupled to the build material reservoir by way of adhesive. A passive valve in the form of an umbrella valve 1152 is mounted within the casing 1151. The umbrella valve 1153 comprises a central member or tail that may be inserted into a bore within an annular valve support member 1153 mounted within the casing 1151. In certain cases, the annular valve support member may comprise part of the casing. A convex diaphragm of the umbrella valve may be supported upon the annular valve support member 1153. The convexity of the diaphragm and/or a preloading of the diaphragm may be selected to configure a predetermined back-pressure at which the valve opens. The umbrella valve may be formed from an elastomer. The gas inlet structure 1150 of FIG. 11H also comprises a filter 1154 to restrict access to the deformable build material reservoir. The filter 1154 may be circular and may comprise a circle of foam together with a retainer to hold the foam against an upper surface of the casing 1151. An induction seal (not shown) may be applied to the top of the casing 1151. The annular valve support member 1153 may be placed after the retainer within the casing 1151.

FIG. 11I shows the gas inlet structure 1150 when the passive valve is actuated at a predetermined back pressure. In this case, the diaphragm elastically deforms to allow gas to flow through the inlet structure 1150. FIG. 11J shows an implementation 1160 of gas inlet structure 1150 as threaded onto a corresponding mounting 1156 within the build material reservoir. The build material reservoir in this case comprises a deformable structure comprising a polymer bag with threaded apertures for the gas inlet structure.

In certain examples, a gas inlet structure as described above may form part of a build material container as described herein. For example, a build material container for a three-dimensional printing system may comprise an external casing and at least one internal reservoir for holding build material. Each internal reservoir may be positioned within the external casing and may comprise an outlet structure through which build material is supplied when a vacuum is applied, and an inlet structure with an airflow valve, wherein the airflow valve of each internal reservoir is selectively actuatable to collapse and re-inflate each reservoir during supply of build material.

Figure 12:
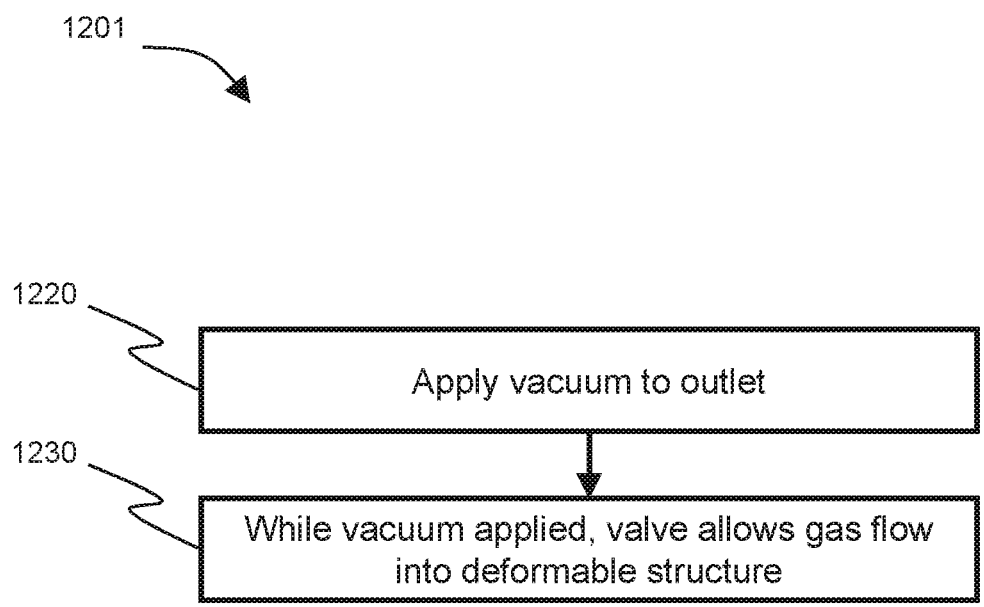
FIG. 12 is a flow diagram showing an example method for supplying build material in a three-dimensional printing system.

FIG. 12 shows an example method 1201 of supplying build material for a three-dimensional printing system. At the start of the method 1201, an inlet of a deformable or collapsible structure storing build material is closed. This may be because a pressure within the structure is above a predetermined threshold or because an electronic signal to open a valve of the inlet is not supplied (an electronic signal to close the valve may be supplied at this stage). At block 1220, a vacuum, i.e. a low pressure source, is applied to an outlet of the deformable structure, while the inlet is closed, to extract build material from the deformable structure to supply the three-dimensional printing system. This vacuum may be applied by a build material transport system 215 as described with reference to FIGS. 2A and 2B. Lastly, at block 1230, while the vacuum is applied to the outlet, a pressure difference is caused through application of the vacuum within the deformable structure to cause a valve of the inlet to allow gas flow into the deformable structure. The valve may be a passive valve or an active valve. The valve may be configured to open at a predefined back-pressure. For example, a passive valve such as an umbrella valve may have a resistance set to open at the predefined back-pressure. An active valve may be opened in response to an electronic control signal in response to a detection by a pressure sensor of the pre-defined back pressure, wherein the active valve is closed in absence of the electronic control signal. This method may be applied to implement the cycles shown in FIGS. 11D to 11G using one of the aforementioned gas inlet structures.

In one case, the method comprises measuring a pressure in a vacuum system coupled to the outlet and activating the active valve at a predefined threshold pressure. In another case, the method comprises supplying the electronic control signal to open the active valve at predefined time intervals. The latter case may be applied in addition, or instead of, a case where a pressure is measured. In the latter case, the predefined time intervals may be configured such that structures do not form in the build material.

In one example, the gas inlet valve described in the present examples may be used to help remove the deformable structure from a surround when a build material container needs to be dismantled for recycling. For example, if the vacuum is applied to the outlet after the build material has been extracted, because the valve is initially closed, e.g. until a predefined back pressure is reached, the side of the deformable structure may deform inwards such that they become detached from the surround. The deformable structure may thus be easily removed from the surround for recycling. In this case, and in other situations, a passive valve such as that shown in FIGS. 11A and 11H to J may prevent build material from exiting the inlet of the deformable structure, e.g. during cycles of expansion and contraction of the sides of the structure.

Certain examples described with reference to FIGS. 11A to 11J and 12 address a case where an air passageway forms in the build material in a build material bag such that air, rather than build material, is extracted from the bag. Certain examples introduce a selective valve within an air inlet. This valve is actuatable at a given pressure. When a "rathole" forms the air inlet is initially closed. As mainly air rather than mainly build material is extracted by the processing station, the pressure inside the bag decreases and the bag deforms inwards. When the given pressure is reached, air is allowed through the air inlet to re-expand the bag. This concertina or bellows effect collapses the "rathole" allowing build material to again be extracted under the vacuum. This operation may be cycled multiple times during operation. As build material is extracted then the cycles may become more frequent, e.g. as a larger proportion of gas is extracted along with the build material due to the increased size of the empty volume of the deformable structure.

Figure 13A:
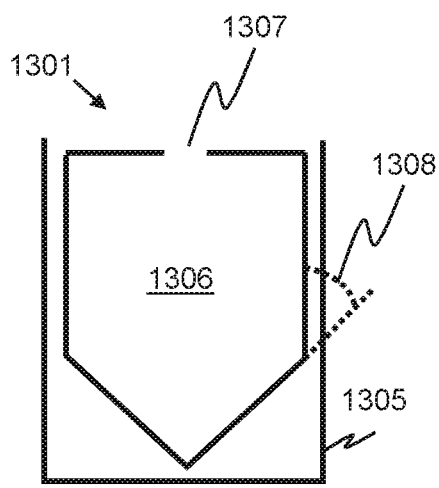
FIGS. 13A to 13C are schematic cross sections of an example build material container comprising multiple container cells.
Figure 13B:
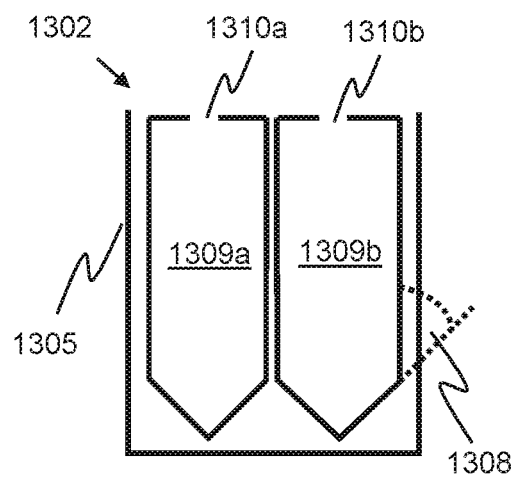
Figure 13C:
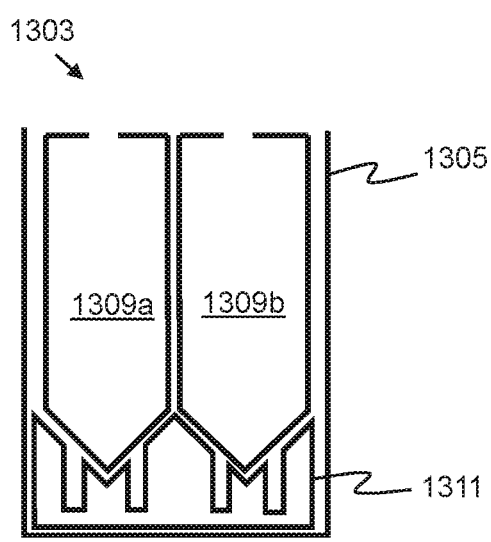

FIGS. 13A to 13C present example build material containers 1301-1303. These build material containers are adapted to contain multiple build material reservoirs or "container cells".

FIG. 13A shows schematically a build material container 1301, comprising an external casing 1305 and a single deformable reservoir 1306, for example as described in more detail above. The reservoir has an outlet 1307 to supply build material stored within the deformable reservoir. The reservoir has a lower vertex, with lower sides leading to the vertex being at an angle 1308. The vertex may comprise a vertex of a pyramid, cone shape or similar polyhedron. As explained above, the presence of such a vertex enables build material to be efficiently extracted from the build material reservoir 105, e.g. the build material collects around the vertex in the interior of the outer structure 120 where it may be extracted using an aspiration channel (not shown). The angle 1308 may be an "avalanche" angle, or angle of repose, i.e. an angle at which build material falls down, under gravity, the lower sides of the build material reservoir 105 towards the vertex. The angle of repose may be a constant based on at least one of a design of the build material reservoir, type of build material, and material of side walls of the build material reservoir. The "avalanche" angle may depend on a coefficient of friction for the side walls and a diameter of a particle of build material.

FIG. 13B shows schematically a build material container 1302, comprising an external casing 1305 and a plurality of reservoirs 1309a, b within the external casing 1305. Each reservoir 1309a, b has an outlet 1310a, b to supply build material stored within their respective reservoirs, for example as described in more detail above. In some examples, the outlet structures are selectively sealable. The reservoirs may be deformable reservoirs, as described in more detail above.

Each reservoir 1309a, b has a vertex, with lower sides leading to the vertex being at the same angle 1308 as shown in FIG. 13A. The reservoirs 1309a, b may have common dimensions. It should be noted that although FIG. 13B shows the same lower side angle for each reservoir 1309a, b, in other examples the lower side angles may differ between reservoirs. In examples, each reservoir 1309a, b comprises an aspiration channel coupled to the outlet 1310a, b and extending along the length of the reservoir 1309a, b.

As can be seen from FIGS. 13A and 13B, despite having the same lower side angle 1308 and thus correspondingly similar efficiencies of build material extraction efficiency, the plural reservoirs 1309a, b of the container 1302 occupy a greater proportion of the container 1302 than the single reservoir 1306 of container 1307. As such, for a given container size, the use of plural reservoirs allows a greater quantity (i.e. volume) of build material to be contained, whilst keeping the same lower side angle 1308 and thereby not compromising efficiency of extraction. For example, if the build material reservoirs are made of a similar material and contain similar build material, the "avalanche" angle may be within a common range for both FIGS. 13A and 13B.

The use of plural reservoirs 1309a, b also allows a given reservoir 1309a, b to remain sealed until used, for example as described above in relation to FIG. 6I. This reduces the length of time that a given reservoir 1309a, b is open to the atmosphere, thereby improving preservation of build material. For example, preservation may be improved by preventing admission of humidity in to the build material and/or oxidation of metal powder build material.

In some examples, the plurality of deformable reservoirs 1309a, b contain a common build material. In addition to increasing the volume of build material in the container, this allows the container to be connected to a three-dimensional printing system capable of receiving build material from two or more reservoirs 1309a, b, for example by way of a pair of build material supply hoses connected to the outlets 1310a, b. One hose can thus be disconnected from an outlet 1310a, b of an empty reservoir 1309a, b and connected to an outlet 1310a,b of a full reservoir 1309a, b, while the other hose is connected to a non-empty reservoir 1309a, b. In this manner, uninterrupted printing may be performed.

Alternatively, at least two of the plurality of deformable containers may contain different building materials. This allows switching between such building materials, which may for example produce different mechanical properties, or finishes or colors, in a printed article.

In some examples, the plurality of deformable reservoirs 1309a, b are arranged to form a plurality of columns and a plurality of rows within the external casing 1305, for example as described above in relation to FIGS. 3D and 3E.

In examples, each deformable reservoir 1309a, b comprises an inlet structure to allow at least one of build material and gas to flow into the reservoir.

FIG. 13C shows schematically an example build material container 1303, comprising an external casing 1305 and a plurality of deformable reservoirs 1309a, b as described above. Each deformable reservoir 1309a, b comprises an aspiration channel and a surround, wherein a base of each surround comprises a vertex formed at an end of the aspiration channel. As described above, the base comprises at least one lower angled surface.

The build material container 1303 further comprises a support structure 1311 to accommodate the vertices, and to support the lower angled surfaces, of the plurality of surrounds. The support structure 1311 may be configured as described above in relation to FIGS. 1H and 1I.

Figure 13D:
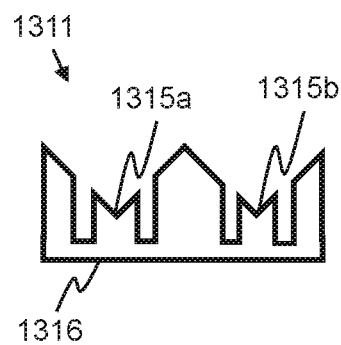
FIG. 13D is a schematic diagram of a support element for multiple container cells.

FIG. 13D shows schematically a support structure 1311 for a build material container 1303. The support structure 1311 comprises a plurality of polyhedral indentations 1315a, b in an upper portion of the support structure 1311. Each polyhedral indentation 1315a, b is configured to receive a base of a container cell for the build material container. In some examples, the polyhedral indentations are regularly spaced in the upper portion.

A base 1316 of the support structure is arranged to rest on a planar surface, such as the bottom of the build material container 1303. For example, the support structure 1311 may be dimensioned to be accommodated within a base of a cuboid build material container 1303.

Figure 14:
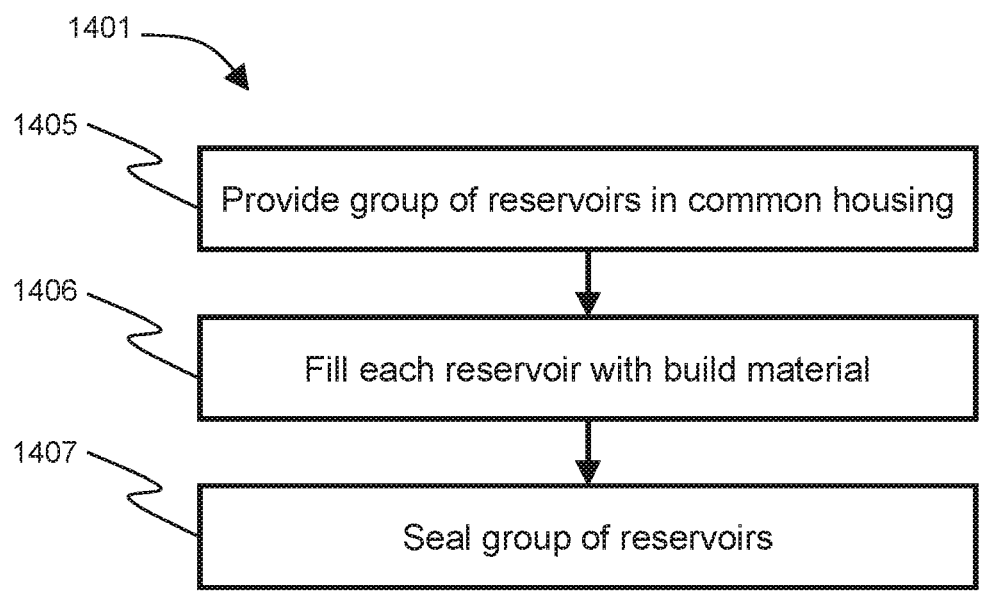
FIG. 14 is a flow diagram showing an example method for filling a build material container.

FIG. 14 presents a flow chart of a method 1401 of filling a build material container, according to an example. At block 1405, the method 1401 comprises providing a group of deformable build material reservoirs in a common housing. At block 1406, the method 1401 comprises filling each of the group of deformable build material reservoirs in the common housing with build material. At block 1407, the method 1401 comprises a block 1407 of sealing the group of deformable build material reservoirs. This may comprise a heat, vacuum and/or adhesive seal, amongst others.

The method 1401 may comprise folding upper sections of the common housing over the sealed deformable build material reservoirs to protect said reservoirs during transport, for example as described above in relation to FIG. 5.

In some examples, the method 1401 further comprises unsealing an outlet of one of the deformable build material reservoirs, and coupling an aspiration system of a three-dimensional printing system to the outlet to extract build material via the outlet, for example as described above in relation to FIG. 6I.

According to an example, there is provided a build material container for a three-dimensional printing system. The build material container comprises a plurality of reservoirs (i.e. container cells) to store build material. Each container cell comprises an outlet structure to couple the container cell to the three-dimensional printing system, and an aspiration channel coupled to the outlet structure and extending along the length of the container cell. A base of the container cell comprises a vertex formed at an end of the aspiration channel, the base comprising at least one lower angled surface. The container further comprises a support structure to accommodate the vertices, and to support the lower angled surfaces, of the plurality of container cells.

Figure 15A:
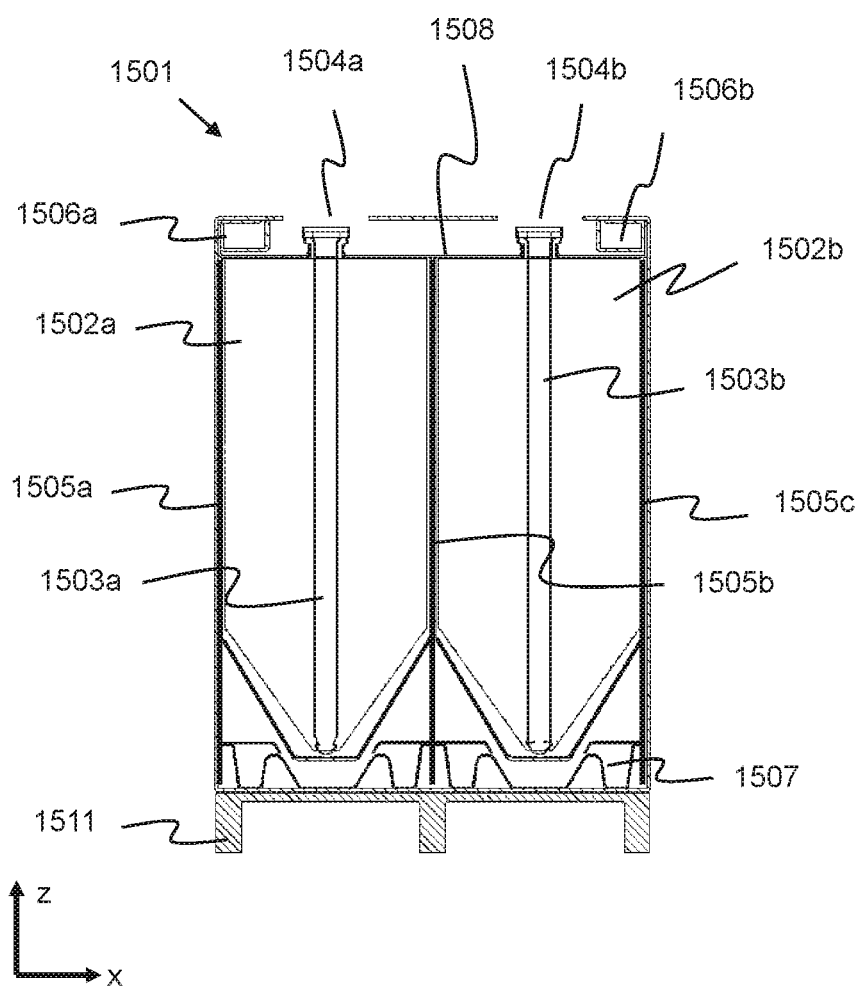
FIGS. 15A and 15B are respective front and lateral cross sections of an example build material container.
Figure 15B:
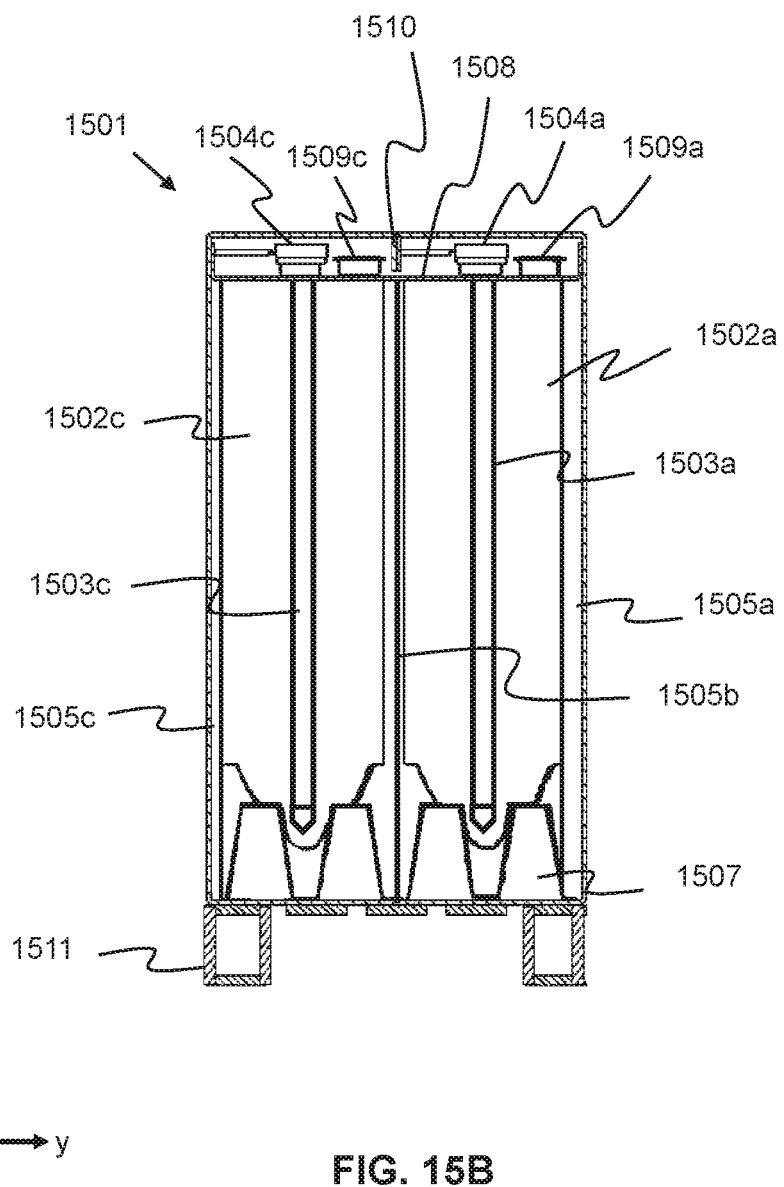

FIGS. 15A and 15B show cross sections of a build material container 1501 implementing multiple above-described examples. FIG. 15B represents a view rotated 90 degrees about a vertical axis of the container 1501. Build containers may similarly implement any combination of the examples described herein.

The container 1501 comprises a plurality of build material reservoirs 1502a, b, each having a corresponding aspiration channel 1503a-c and inlet and/or outlet structures 1504a-c as described above for example in relation to FIGS. 1D to 1F and/or 11A to 11J. Another channel structure may be present behind the viewable structures in the Figure. The channel structures 1504a-c are exposed by removal of structurally weakened portions of the external casing, as described above in relation to FIGS. 6A to 6I. For example, FIG. 15A shows apertures in an upper surface of the build material container 1501 where portions have been removed above. The reservoirs 1502a-c are supported by a support structure 1507, for example as described above in relation to FIGS. 1H and 1I and/or 13C and 13D. In practice, the support structure may comprise a plurality of support structures such as 1507 to provide a desired height for the build material reservoirs 1502. FIG. 15B also shows inlet structures 1509a, c that are arranged next to the outlet structures 1504a, c. In FIG. 15B the outlet structures are shown with an upper lid open and pivoted to one side to allow access. In FIG. 15B a second set of stiffening members 1510 are also visible—these comprise the folded edges of the front and rear flaps for the external casing of the build material container 1501.

As described previously, an example build material container 1501 may be 1.5 m tall (i.e. a length in a z dimension as indicated in the Figures), with a length of 1 m (i.e. a length in an x dimension as indicated in the Figures) and a width of 0.75 m (i.e. a length in a y dimension as indicated in the Figures). A height of examples may generally be within a range of 1 to 2 m and widths and lengths may be selected from a range of 0.5 to 2 m. A width and length of the build material container 1501, e.g. dimensions of a horizontal cross section, may have equal or different values. In an example with four internal reservoirs arranged as shown in FIG. 16, each internal reservoir may have a length (in x dimension) of around 50 cm, a width (in a y dimension) of around 37.5 cm, and a height (in a z-dimension) of around 120 to 140 cm. The support structure may be 30 to 40 cm high with dimensions to fit within the base of the build material container 1501. The support structure may have a height of around 5 to 20 cm in its lowest portion to accommodate a vertex of the build material reservoir. An angle of repose may be within the range of 50 to 70 degrees.

The container 1501 further comprises columnar load-bearing elements 1505a-c, and an upper compartment comprising folded stiffening members 1506a, b, as described above in relation to FIGS. 3A to 3C. The container 1501 also comprises a partition 1508, as described above in relation to FIGS. 9A to 9F.

The container 1501 is mounted on a pallet 1511, such as a wooden pallet. The pallet may have a length and a width (i.e. x and y dimensions) equal to the external casing, e.g. 1×0.75 m. It may have a standard height, e.g. 15 to 20 cm. In some examples, the pallet 1511 is integral to the build material container 1501. In other examples, the pallet 1511 is a separate component, attached to the container 1501 for example by adhesive or straps. The pallet 1511 simplifies transport and storage of the container 1501.

In some examples, following use the container 1501 is separated into its component parts, packaged and returned to a build material supplier for refilling.

FIG. 16 shows schematically an exploded perspective view of a build material container 1601 according to an example. This view demonstrates one way in which a build material container may be constructed. The container 1601 comprises an external casing 1602. A support structure (not shown) may be present within the external casing 1602, for example this may be inserted following construction of the external casing 1602. Within the external casing 1602 are columnar load-bearing elements 1603, for example as described above. The casing 1602 further comprises upper flaps 1603a, b with foldable portions, the foldable portions being for producing stiffening members for transferring load to the columnar load-bearing elements 1603 as described above.

The container 1601 further comprises a plurality of build material reservoirs 1605, as described above. The columnar load-bearing elements 1603 may be used as guides when inserting the reservoirs 1605 into the casing 1602, to aid in accurate positioning.

The container 1601 comprises a partition 1607, the partition being to form an upper surface of the internal compartment and thereby to collect build material during use of the channel structure as described in more detail above.

The preceding description has been presented to illustrate and describe certain examples. Different sets of examples have been described; these may be applied individually or in combination for a synergetic effect. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A build material container for a three-dimensional printing system, comprising:
    an external casing;
    an internal compartment within the external casing, comprising:
        a reservoir to store build material, the reservoir having a channel structure;
        a surround that encloses the reservoir; and
        a partition within which the channel structure is mounted, the partition forming an upper surface of the internal compartment and being independent from the external casing and the surround,
    wherein the partition restricts access to the internal compartment, and
    wherein the partition is arranged to collect build material during use of the channel structure.

2. The build material container of claim 1, comprising:
    a plurality of reservoirs having a plurality of respective channel structures,
    wherein the partition supports the plurality of channel structures within a set of respective apertures.

3. The build material container of claim 1, wherein the partition comprises:
    a planar portion,
    a plurality of side portions that project upwards,
    wherein the side portions abut side walls of the external casing.

4. The build material container of claim 3, wherein the planar portion comprises a lower surface of an upper compartment of the external casing and the side portions are accommodated between the side walls of the external casing and stiffening members of the upper compartment.

5. The build material container of claim 1, wherein the channel structure comprises at least one of an inlet and an outlet for the structure.

6. The build material container of claim 1, comprising:
    a plurality of columnar load-bearing elements arranged below the partition,
    wherein load is distributed to the load-bearing elements through the partition.

7. A method of filling the build material container of claim 1 for a three-dimensional printing system, the method comprising:
    supplying build material to an inlet of the reservoir that is internal to the build material container to fill the build material container; and
    removing stray build material within a tray located above the internal reservoir during said supplying, said inlet being located within an aperture of the tray, the tray comprising flanges that abut side walls of the build material container to prevent stray build material from entering an interior of the build material container.

8. The method of claim 7, comprising:
    following removing stray build material, closing the build material container to form an outer protective surface.

9. The method of claim 7, wherein supplying build material to an inlet of the internal reservoir comprises supplying build material to multiple internal reservoirs within the build material container.

10. A build material container for a three-dimensional printing system, comprising:
- an external casing;
- an internal compartment within the external casing, comprising:
  - a reservoir to store build material, the reservoir having a channel structure;
  - a surround that encloses the reservoir; and
- a partition within which the channel structure is mounted, the partition forming an upper surface of the internal compartment and being independent from the external casing and the surround,
- wherein the partition restricts access to the internal compartment,
- wherein the partition is arranged to collect build material during use of the channel structure;
- wherein the partition comprises:
  - a planar portion, and
  - a plurality of side portions that project upwards, wherein the side portions abut side walls of the external casing;
- wherein the planar portion comprises a lower surface of an upper compartment of the external casing and the side portions are accommodated between the side walls of the external casing and stiffening members of the upper compartment and
- wherein the partition comprises a plurality of slots to receive respective tabs of the stiffening members.

11. A method of assembling the build material container of claim 1 for a three-dimensional printing system, the method comprising:
- obtaining the external casing for the build material container, the external casing comprising base and side portions;
- arranging the reservoir internal to the external casing, the internal reservoir storing build material and comprising the channel structure and the surround; and
- arranging the partition above the internal reservoir and the surround, the partition comprising an aperture to receive the channel structure of the reservoir, including:
- arranging the partition to form a lower surface of an upper compartment of the build material container,
- arranging the partition to restrict access to a volume of the external casing below the partition, and
- arranging the partition to collect build material during use of the channel structure.

12. The method of claim 11, comprising:
- supplying powdered build material to the internal reservoir via the channel structure; and
- folding upper sections of the side portions over the channel structure of the internal reservoir to form a protective upper surface of the build material container.

13. The method of claim 12, wherein folding upper sections of the side portions comprises:
- folding a first set of opposing upper sections to generate upper stiffening members that extend along opposing sides of the build material container, including securing flanges of the partition between the side portions and the stiffening members; and
- folding a second set of opposing upper sections over the stiffening members to form the upper surface of the build material container.

14. The method of claim 13, wherein folding a first set of opposing upper sections comprises:
- securing tabs located on the upper stiffening members within respective slots upon the partition.

15. The method of claim 11, wherein:
- arranging an internal reservoir comprises arranging a plurality of internal reservoirs within a support structure, and
- arranging a partition comprises aligning apertures within the partition with inlets of the plurality of internal reservoirs.

16. A build material container for a three-dimensional printing system, comprising:
- an external casing;
- an internal compartment within the external casing, comprising:
  - a reservoir to store build material, the reservoir having a channel structure;
  - a surround that encloses the reservoir; and
- a partition having an aperture therein to accommodate the channel structure extending from the reservoir, the partition forming a cover over the internal compartment and being a separate piece from the external casing and the surround,
- wherein the partition has a lip around its periphery to prevent material on the partition from entering the internal compartment and to collect build material during use of the channel structure.

17. The build material container of claim 16, wherein the reservoir contains a quantity of a powdered build material for a 3D printing system.

18. The build material container of claim 16, wherein the lip is accommodated between interior sides of the external casing and a stiffening member.

19. The build material container of claim 18, further comprising load bearing elements extending from top to bottom in the internal compartment, the stiffening member being supported on the load bearing elements, the partition being disposed between the stiffening member and the load being elements.

20. The build material container of claim 18, wherein the partition comprises slots located to receive tabs on the stiffening member to secure the stiffening member in place relative to the partition.

* * * * *